US011216157B2

(12) United States Patent
Boshoff

(10) Patent No.: US 11,216,157 B2
(45) Date of Patent: Jan. 4, 2022

(54) DISPLAY AND INTERACTION METHOD IN A USER INTERFACE

(71) Applicant: Swirl Design (Pty) Ltd, Western Cape (ZA)

(72) Inventor: Hendrik Frans Verwoerd Boshoff, Stellenbosch (ZA)

(73) Assignee: Swirl Design (Pty) Ltd, Western Cape (ZA)

( * ) Notice: Subject to any disclaimer, the term of this patent is extended or adjusted under 35 U.S.C. 154(b) by 0 days.

(21) Appl. No.: 17/093,577

(22) Filed: Nov. 9, 2020

(65) Prior Publication Data

US 2021/0072874 A1    Mar. 11, 2021

Related U.S. Application Data

(63) Continuation of application No. 15/776,241, filed as application No. PCT/IB2016/057810 on Dec. 20, 2016, now Pat. No. 10,877,627.

(30) Foreign Application Priority Data

Dec. 23, 2015  (ZA) ................................. 2015/09345
Mar. 11, 2016  (ZA) ................................. 2016/01678

(51) Int. Cl.
*G09G 5/00*       (2006.01)
*G06F 3/0482*    (2013.01)
(Continued)

(52) U.S. Cl.
CPC ........... *G06F 3/0482* (2013.01); *G04G 21/00* (2013.01); *G06F 3/0485* (2013.01); *G06F 3/04817* (2013.01); *G06F 3/04883* (2013.01)

(58) Field of Classification Search
CPC ... G04G 21/00; G06F 3/04817; G06F 3/0485; G06F 3/04883; G06F 3/0482; G06F 3/00; G06F 3/048; G09G 5/00
See application file for complete search history.

(56) References Cited

U.S. PATENT DOCUMENTS

| 6,556,222 B1 | 4/2003 | Narayanaswami |
| 2007/0152983 A1 | 7/2007 | McKillop et al. |

(Continued)

OTHER PUBLICATIONS

Patent Cooperation Treaty, International Search Report and Written Opinion of the International Searching Authority, International Patent Application No. PCT/IB2016/057810, dated Apr. 21, 2017, 8 Pages.

(Continued)

*Primary Examiner* — Pegeman Karimi
(74) *Attorney, Agent, or Firm* — Fenwick & West LLP

(57) ABSTRACT

A display and interaction method in a user interface is provided. A display region is provided on the user interface for displaying a plurality of interactive items on a track. The track extends along a path created between an outer elliptical border and an inner elliptical border. The inner border lies within the outer border and a center of the inner border is offset from a center of the outer border. A plurality of elliptical frames are provided along the track, and each frame is in contact with the inner border, outer border, and its adjacent frames. An interactive item is displayed in some of the elliptical frames, and user input may move the frames along the track. The frames change in size as they move along the track.

19 Claims, 18 Drawing Sheets

(51) Int. Cl.
*G04G 21/00* (2010.01)
*G06F 3/0481* (2013.01)
*G06F 3/0485* (2013.01)
*G06F 3/0488* (2013.01)

(56) References Cited

U.S. PATENT DOCUMENTS

| | | |
|---|---|---|
| 2007/0236475 A1 | 10/2007 | Wherry |
| 2011/0157046 A1* | 6/2011 | Lee .................. G06F 1/1643 345/173 |
| 2013/0104079 A1 | 4/2013 | Yasui et al. |
| 2013/0339904 A1 | 12/2013 | Geithner |
| 2014/0347289 A1 | 11/2014 | Suh et al. |
| 2016/0202866 A1* | 7/2016 | Zambetti .............. G06F 1/163 715/835 |
| 2016/0320756 A1* | 11/2016 | Lee ................. G06F 3/03547 |
| 2017/0205967 A1* | 7/2017 | Boshoff ............... G06F 3/0482 |
| 2018/0059624 A1 | 3/2018 | James |
| 2019/0369835 A1 | 12/2019 | Chen et al. |

OTHER PUBLICATIONS

United States Office Action, U.S. Appl. No. 15/776,241, dated May 29, 2020, ten pages.

\* cited by examiner

DISPLAY AND INTERACTION METHOD IN A USER INTERFACE

CROSS-REFERENCES TO RELATED APPLICATIONS

This application is a continuation of U.S. patent application Ser. No. 15/776,241, filed on 15 May 2018, which claims priority from South African provisional patent application number 2015/09345 filed on 23 Dec. 2015, and South African provisional patent application number 2016/01678 filed on 11 Mar. 2016, each of which is incorporated by reference herein in its entirety.

FIELD OF THE INVENTION

This invention relates to display and interaction in a user interface. More particularly, the invention relates to a method of displaying a plurality of interactive items, navigating through the items, and selecting an item, which may be particularly, but by no means exclusively, suited to small circular displays and to larger displays on which preview items are to be displayed.

BACKGROUND TO THE INVENTION

In many electronic devices, such as mobile phones, tablet computers, personal computers, or the like, a user interface is provided to receive user input and to control a display of the electronic device so as to allow a user to interact with the electronic device.

Displays of electronic devices are often similarly shaped, typically rectangular and in similar proportions, with the result that known display methods may be suitable for use on a variety of different devices. With the advent of wearable electronic devices, such as headsets and smartwatches, displays are often in a shape that is not rectangular, and also of a smaller size than the displays of mobile phones, tablets or the like. As a result, known display methods may not be suitable for use on devices with screens that are different from rectangular screens, or for screens of particularly small sizes. For example, on a smartwatch with a round display, a rectangular display method used on a mobile phone may not be suitable due to the limitations in size and display space. However, on a small rectangular display, known display methods may also not be adequate.

Navigating through a plurality of interactive items on any display, but particularly on a small display, may be problematic due to the fact that the interactive items need to be small so that a plurality thereof can be displayed on the screen, while navigating through such interactive items using a display method for a rectangular device may be particularly difficult. The interactive item may, for example, be an icon, a menu item, an application, an image or video, a button or any other item positioned in a display region of the electronic device. Throughout this specification, the term "interactive item" should be broadly interpreted and is used to refer to any target provided by a user interface which may or may not be displayed at that time and which a user may wish to select.

In an example of an existing display method on a circular display of a smartwatch, a selection indicator is moved between different interactive items on the display. The user may then perform a selection action to select the interactive item marked by the selection indicator. However, these items are often small and may be difficult to identify by a user. Additionally, this movement may not be fluid, with definite jumps between items, which may be undesirable to a user. Additionally, when a large number of interactive items need to be navigated, a paging method must be employed. This may limit the fluidity of navigation. A user may find it difficult to navigate through such a list of items as they may not have an indicator of the next item in the list. Selection of small interactive items may be problematic due to a user's finger occluding a significant portion of a small screen.

Known navigation methods on larger displays, including rectangular displays, may be cumbersome or difficult for a user. When navigating a large number of interactive items, a user may wish to display a plurality of interactive items on the display. This may assist the user in orienting themselves within the number of items, so as to know when a specific item may appear on the display during navigation, preview multiple items or to allow a user to scan multiple interactive items at once. However, when multiple interactive items are displayed on known displays, the interactive items may not be clear enough to view or easily navigate. Users may therefore choose to navigate through interactive items in a paging mode, but this may require multiple repeated interactions with the display in order to cycle through the interactive items. This may be undesirable to a user.

The present invention aims to alleviate these and other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a display and interaction method in a user interface including the steps of:
 providing a display region for displaying a plurality of interactive items on a track, the track extending along a path created between an outer elliptical border and an inner elliptical border, with the inner border lying within the outer border and with a center of the inner border offset from a center of the outer border;
 providing a plurality of elliptical frames along the track, each frame in contact with the outer border, the inner border, a first neighboring frame adjacent it and in a first direction along the track, and a second neighboring frame adjacent it and in an opposite, second direction along the track;
 displaying one or more interactive items each based on one of the elliptical frames; and
 in response to receiving a predetermined user input, moving the plurality of elliptical frames along the track, with the plurality of elliptical frames changing in size to remain in contact with the inner boundary, outer boundary, first neighboring frame and second neighboring frame whilst moving.

Further features provide for each of the one or more interactive items to be within one of the frames; for an interactive item to change in size corresponding to a change in size of its frame; for an interactive item within a frame to fade into or out of view corresponding to a change in size of the frame; or for a frame to display only a part of an interactive item, with an increase in size of the frame allowing for visibility of more of the interactive item.

Still further features provide for the track to be an elliptical track; and for centers of the frames to move along the track.

Yet further features provide for the outer border to lie adjacent to or to be defined by a boundary of a circular display; for the circular display to be that of a smartwatch; and for the circular display to be a touch-sensitive display.

A further feature provides for the method to include the step of, in response to receiving a selection input, selecting an interactive item. In one embodiment, a largest displayed frame from the plurality of frames is allocated as a primary frame, and the selection input selects the interactive item based on the primary frame. The selection input may be that the display is touched in any location. In an alternative embodiment, the selection input is that any frame or interactive item is selected via a touch action performed on the touch-sensitive display on the frame or interactive item. In at least one embodiment, only some of the interactive items may be selectable, possibly only interactive items based on larger frames.

An interactive item may be animated to maximize from its position when selected; and may grow until it covers the entire display or the area enclosed by the outer border. In some embodiments, a return, back or undo function may be provided, and the maximized interactive item may be animated to its previous position in the frame when this function is selected.

A further feature provides for the predetermined user input to be received from an input device of an electronic device housing the display; for the electronic device to be a smartwatch; and for the input device to be an operating bezel, operating crown, operating button, operating switch, touch-sensitive display, or the like of the smartwatch; alternatively for the predetermined user input to be received from an external input component such as a computer mouse, a keyboard, a remote control or the like.

Still further features provide for the predetermined user input to include a first mode of touch interaction in which the frames are moved along the track in response to a rotating touch input on the touch-sensitive display or a rotation flicking gesture on the touch-sensitive display in the desired rotation direction, and wherein the rotating touch input causes the frames to rotate at a constant speed or near constant speed with gradual deceleration.

Yet further features provide for the predetermined user input to include a second mode of touch interaction in which a touch input provides a non-linear speed control of the speed of rotation of the frames along the track; for the non-linear speed control to be a one dimensional control having a center point from which touch movement in a first direction away from the center point causes accelerated rotation of the frames in a first direction along the track and touch movement in a second direction away from the center point causes an accelerated rotation of the frames in a second direction along the track; and for the one dimensional control to be along a line or arc in a designated area of the display. The center point may be variable, and may be allocated as a first position of touch on the display.

Further features provide for the predetermined user input to include a combination of the first and second mode of touch interaction and wherein a first touch of a user on an area of the touch-sensitive screen designated for activating one of the first or second mode of touch interaction activates that mode of touch interaction; and for the method to include the step of providing an indication of the current mode of touch interaction.

A still further feature provides for the number of frames provided on the display to be less than a number of interactive items in a list such that interactive items in the frames at a given time represent a subset of the total number of interactive items in the list.

Yet further features provide for the method to include the step of providing a transition zone; and for the display to be configured such that the subset of interactive items is updated as a frame moves through the transition zone.

Further features provide for the subset of interactive items to be arranged in order such that a highest position in the subset and a lowest position in the subset are located adjacent the transition zone and at opposite sides thereof, for the subset to be updated by replacing a specific interactive item in the list as a frame in which the specific interactive item is located moves through the transition zone; for the interactive item in the highest position in the subset to be replaced in its frame by an interactive item one position lower than the lowest interactive item in the subset as the frame with the highest position in the subset moves through the transition zone; and for the interactive item in the lowest position in the subset to be replaced by the interactive item one position higher than the highest interactive item in the list when the frame with the lowest position in the subset moves through the transition zone.

In at least one embodiment, the transition zone includes a transition line, and a frame may have parts of different interactive items in it as it moves over the line. In at least one further embodiment, the frames darken or fade as they move towards the transition zone, and may lighten or become clearer as they move away from the transition zone. In such an embodiment, the transition zone may be dark or clear so that replacement of interactive items is not visible to a user.

In at least one embodiment, when the subset of interactive items reaches the end of the list, the final item in the list is included in a frame, subsequent frames appearing from the transition zone are empty; and movement in a current direction stops when the frame with the final interactive item in the list reaches its largest possible size. In an additional embodiment, the subset of interactive items restarts at an opposite end of the list when the final item in the list appears from the transition zone.

Further features provide for the interactive items to define hierarchy headings, with selection of a main hierarchy heading interactive item causing replacement of the interactive items on the display with sub-heading interactive items associated with the selected hierarchy heading interactive item; and for the method to include the step of, responsive to receiving a return input whilst sub-heading interactive items are displayed, causing replacement of the sub-heading interactive items on the display with main heading interactive items.

Still further features provide for at least one of the interactive items to be a lower order display region for displaying a plurality of lower order interactive items on a lower order track, the lower order track extending along a lower order path created between a lower order outer elliptical border and an lower order inner elliptical border within the at least one interactive item, with the lower order inner border lying within the lower order outer border and with a center of the lower order inner border offset from a center of the lower order outer border; for the method to include the step of providing a plurality of lower order elliptical frames along the lower order track, each lower order frame in contact with the outer border of the interactive item, the inner border of the interactive item, a first neighboring lower order frame adjacent it and in a first direction along the lower order track, and a second lower order neighboring frame adjacent it and in an opposite, second direction along the lower order track; and for a selection input performed on the interactive item to cause the lower order display region to fill the display region.

A yet further feature provides for several display regions to be provided on a single display, each including a display and interaction method in a user interface in accordance with the invention and being independently controllable and selectable by suitable user input.

A further feature provides for the interactive items to be multimedia items such as pictures or videos, emoticon icons, menu headings, social media posts, video previews, application icons, contact list items, phone numbers, or the like.

Still further features provide for, in an embodiment where the interactive items are videos, the videos to be configured to play whilst displayed; for selection of a video to cause the video to enlarge and, optionally, play in a full-screen mode; for only a selected number of the videos on the display to play whilst displayed; and for the played videos to be interactive items of a larger size than non-playing videos on the display screen.

A yet further feature provides for information regarding the interactive objects, the list of interactive items, the subset of interactive items, or the interactive item in a largest frame on the display to be displayed in an information display space provided in a central region of the inner border.

Further features provide for the step of moving the plurality of frames along the track to include adjusting the speed of the movement; and for the movement to simulate inertia by gradually slowing down responsive to a predetermined user input that resulted in the movement.

A still further feature provides for the method to include the step of, via an configuration interface, allowing a user to adjust the size and/or configuration of the outer border, the inner border, the number of frames forming part of the interface or the orientation of the track with respect to the display, or the variation between the sizes of the frames.

Yet further features provide for the elliptical outer border, elliptical inner border and elliptical frames to be circular; and for the frames, inner circular boundary and outer circular boundary to form a Steiner chain.

The track, the outer elliptical border, the inner elliptical border and the elliptical frames may be hidden from view on the user interface while the interactive items are displayed.

The invention extends to an electronic device having a user interface, the user interface comprising:
- a display component for displaying a plurality of interactive items on a track, the track extending along a path created between an outer elliptical border and an inner elliptical border, with the inner border lying within the outer border and with a center of the inner border offset from a center of the outer border;
- a frame management component for providing a plurality of elliptical frames along the track, each frame in contact with the outer border, the inner border, a first neighboring frame adjacent it and in a first direction along the track, and a second neighboring frame adjacent it and in an opposite, second direction along the track;
- an interactive item management component for displaying an interactive item within at least some of the elliptical frames; and
- an input component for receiving user input.

A further feature provides for the display component to be configured to, in response to receiving a predetermined user input, move the plurality of frames along the track via a moving component.

Still further features provide for the input component for receiving a user input to be received from an input device associated with the display and for the input device to be an operating bezel, operating crown, operating button, operating switch, touch-sensitive display, or the like; alternatively for the predetermined user input to be received from an external input component such as a computer mouse, a keyboard, a remote control or the like.

Yet further features provide for the input component for receiving a user input to include a first touch input component for providing a mode of touch interaction in which the frames are moved along the track in response to a rotating touch input on the touch-sensitive display or a rotation flicking gesture on the touch-sensitive display in the desired rotation direction, and wherein the rotating touch input causes the frames to rotate at a constant speed or near constant speed with gradual deceleration.

Further features provide for the input component for receiving a user input to include a second touch input component for providing a second mode of touch interaction in which a touch input provides a non-linear speed control of the speed of rotation of the frames along the track; for the non-linear speed control to be a one dimensional control having a center point from which touch movement in a first direction away from the center point causes accelerated rotation of the frames in a first direction along the track and touch movement in a second direction away from the center point causes an accelerated rotation of the frames in a second direction along the track; and for the one dimensional control to be along a line or arc in a designated area of the display.

A still further feature provides for the frame management component to be configured to, in response to the frames moving along the track, adjust the size of the frames via a frame adjustment component so that each frame remains in contact with the inner boundary, outer boundary, first neighboring frame and second neighboring frame whilst moving.

Yet further features provide for the interactive item management component to be configured to change the size of an interactive item within a frame corresponding to a change in size of the frame via an interactive item size adjustment component; to fade or change the visibility of an interactive item by fading into or out of view corresponding to a change in location of the frame; or to display only a part of an interactive item, with an increase in size of the frame allowing for visibility of more of the interactive item.

Further features provide for the electronic device to be a smartwatch; for the outer border to lie adjacent to or to be defined by a boundary of the smartwatch; and for the display to be a circular touch-sensitive display of the smartwatch.

Still further features provide for the electronic device to include a rectangular display; and for the electronic device to be a television, computer, tablet or mobile phone.

Yet further features provide for the system to include a configuration component configured to allow a user to adjust the size and/or configuration of the outer elliptical border, the inner elliptical border, or the number of frames forming part of the interface.

A further feature provides for the frames, inner boundary and outer boundary to be circular, and to form a Steiner chain. The track, the outer elliptical border, the inner elliptical border and the elliptical frames may be hidden from view on the user interface while the interactive items are displayed.

An embodiment of the invention will now be described, by way of example only, with reference to the accompanying drawings.

DETAILED DESCRIPTION WITH REFERENCE TO THE DRAWINGS

Figure 1:
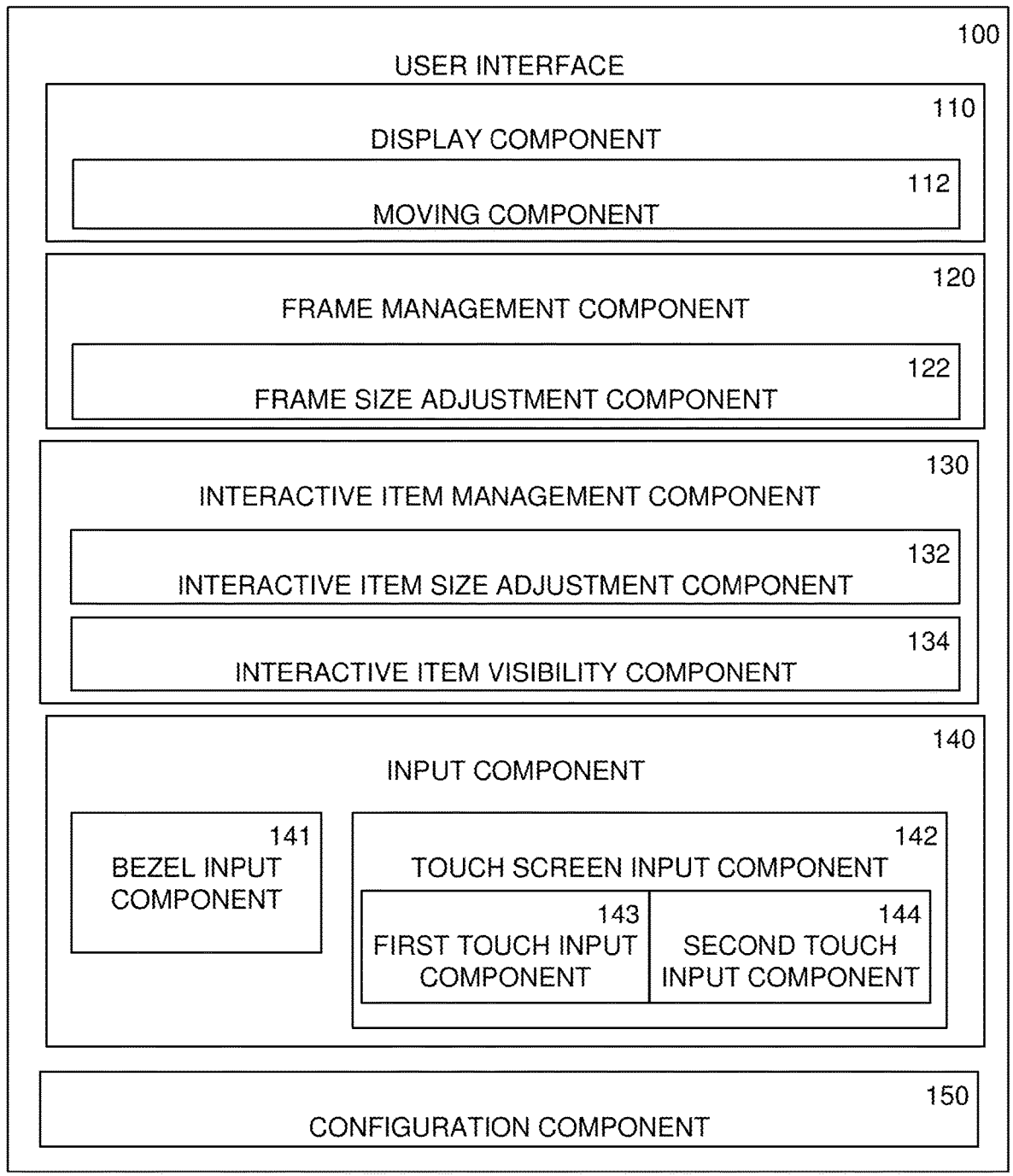
FIG. 1 is a block diagram illustrating logical components of an embodiment of a user interface according to the invention.

Embodiments of the invention provide a user interface usable to display and navigate a plurality of interactive items. Logical components of a user interface (100) according to an embodiment of the invention are shown in FIG. 1.

The user interface (100) may be the user interface of any electronic device incorporating a display, such as a mobile phone, tablet computer, personal computer, television, in-vehicle control or infotainment system, wearable electronic device, smartwatch or the like. As will be apparent later in the description, the user interface is particularly suited for use with a circular display, especially a small circular display such as that of a smartwatch. However, the described user interface may also be used within a rectangular or square display such as a computer screen or television. It should be noted for the purposes of this description that a circle is a specific type of ellipse, with major and minor axes of a circle being of equal length, while a major and minor axis of an ellipse have different lengths.

The user interface (100) may include a display component (110) for displaying a plurality of interactive items on a track. The interactive items may be, for example, multimedia items, emoticons, menu headings, social media posts, video previews, application icons, contact list items, and phone numbers or the like, which may be selected, opened or otherwise interacted with.

As will become apparent from the description that follows, the track may extend along a path created between an outer elliptical border and an inner elliptical border. The inner border may lie within the outer border, with a center of the inner border offset from a center of the outer border. The interactive items may be based on frames within the track which may form a closed Steiner chain if the outer border, inner border and frames are circular.

A Steiner chain of circles may be used to form the basis of the described display and control technique when the borders and frames are circular. Interactive items may be displayed based on the frames of a continuously rotatable asymmetric chain. Only two or three frames may be large enough at any given time for proper view and convenient touch selection. The user controls the chain's rotation rate and lets each frame roll smoothly through the point where it reaches its maximum size. A new item may replace an old one on the opposite side in the smallest frame. Selection may trigger an animation where the frame may grow and move to fill the display with its contents. This procedure can be iterated for next level selection or hierarchy navigation.

A Steiner chain consists of a finite number of circles that are all tangent to two non-intersecting given circles. In addition, every circle in the chain also touches its two neighbors. In certain described embodiments, the frames take the form of the circles and provide a basis for the interactive items giving more flexibility to the display of interactive items based on the frames. For example, the interactive items may be within the frames. The radius ratio of an outer and inner circle is constrained by the number of circles in the chain. If this constraint is met, Steiner's porism guarantees that a closed chain can be constructed starting with any circle that touches them both. This in turn implies that a continuous rotation of the chain is possible.

The display component (110) may include a moving component (112) for moving interactive items along the track when required. Throughout the specification, the term "moving" should be broadly interpreted, and shall include bringing moving items to a standstill, and increasing and/or decreasing the speed of moving items. To the extent created by the display refreshment rate of the electronic device display, the movement may be made to appear continuous and smooth to the user, rather than in discrete steps.

The user interface (100) further includes a frame management component (120) for providing a plurality of frames along the track. The frames in embodiments of the invention are elliptical. Each frame is in contact with the outer border, inner border, and with a first neighboring frame in a first direction along the track thereto, and with a second neighboring frame along an opposite, second direction of the track.

An interactive item management component (130) provides an interactive item based on at least some of the frames, and in some instances positioned within all of the frames. The frames may be visible, or may be located in the background so that it appears that the interactive items move on their own. However, interactive items will be based on elliptical frames as they will move with the frame, as further described below. The described interactive items are generally provided within the frames or congruent with the frames, and centered on the frames. However, the interactive items may be larger than the frames resulting in an overlap of the interactive items. The interactive items may be correspond to a shape of the frames but may be any alternative shape. The frames themselves may be hidden, with only the interactive items being visible and displayed on the display.

In response to movement of the frames along the track, the frames are resized so as to remain in contact with the outer border, inner border and neighboring frames. To ensure this, a frame size adjustment component (122) of the frame management component (120) adjusts the size of the frames. Simultaneously, an interactive item size adjustment component (132) adjusts the size of the interactive items within the frames. The adjustment of the frame size and the interactive item size may be linked to automatically correspond so that they are adjusted in proportion to each other.

In at least some embodiments, the interactive item management component (130) is configured to fade or make interactive items less visible in a specific location along the track. This is achieved via an interactive item visibility component (134).

If the plurality of frames, inner boundary and outer boundary are all circular, they may form a Steiner chain.

In at least some embodiments, a user may be able to adjust the size of the outer border, the offset of the inner border, the number of frames, selected interactive items appearing on the track, the orientation of the track with respect to the display, and/or the variation between the sizes of the frames. This may be done via a configuration component (150).

Movement of the frames and the interactive items therein along the track is initiated by predetermined user input received via an input component (140). The input component (140) may include a bezel input component (141) and/or a touch-sensitive input component (142). The touch-sensitive input component (142) may include a first touch input component (143) and a second touch input component (144). The first touch input component (143) may provide functionality for providing a first mode of touch input in which a user may rotate the interactive items by touching the display in a rotating movement, or by flicking in a rotating direction further details of which are provided below. The second touch input component (144) may provide functionality for providing a second mode of touch input in which a user may rotate the interactive items by touching a slider scale controlling non-linear rotation speed further details of which are provided below.

Figure 2:
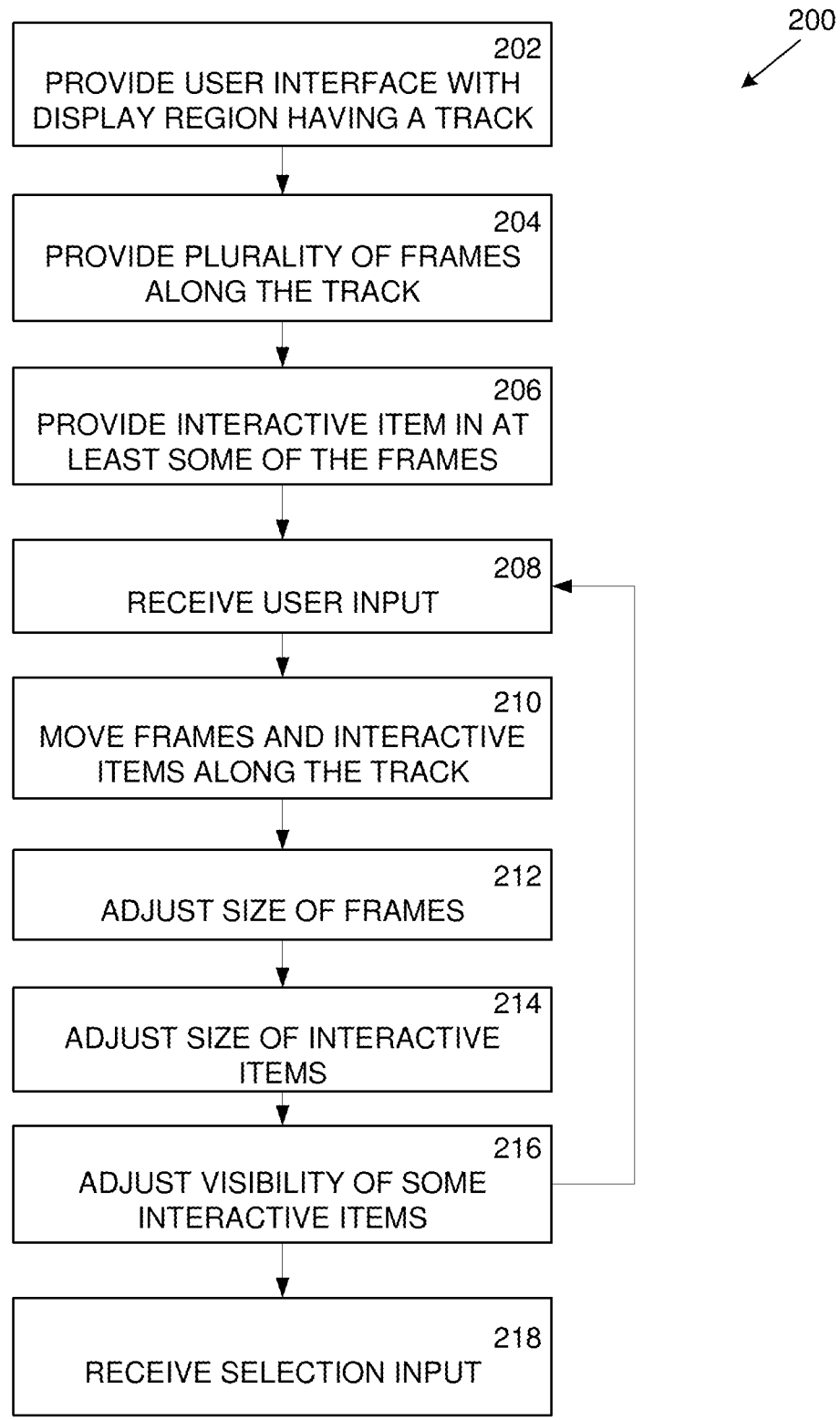
FIG. 2 is a flow diagram illustrating steps performed in a display and interaction method in a user interface according to the invention.

FIG. 2 shows a flow diagram (200) representing an example of a method which may be performed in such a display and interaction method. A plurality of interactive items are displayed (202) on a track provided in a display region of the user interface (100) via the display component (110). As described above, the track may extend along a path created between an outer elliptical border and an inner elliptical border. The inner border may lie within the outer border, with a center offset from a center of the outer border. The display component (110) may include a moving component (112) for moving interactive items along the track when required. The track itself, including the outer elliptical border and inner elliptical border, may be hidden from view so that only the interactive items are visible on the display component (110). Then, only interactive items within the frame may be visible. The user will then only see the interactive items which appear to resize as they move along the track.

A plurality of frames are provided (204) along the track by the frame management component (120). As mentioned, these frames may be in the background and may not necessarily be displayed on the display. As also described above, each frame is in contact with the outer border, inner border, and with a first neighboring frame in a first direction along the track thereto, and with a second neighboring frame along an opposite, second direction of the track.

An interactive item is provided (206) in at least some of the frames, possibly in all of the frames.

User input is received (208) from the input component (140). In response to receipt of a predetermined input, the plurality of frames and the interactive items therein move (210) along the track. Movement is facilitated by the moving component (112). The direction and speed of movement depend on the input received.

The frame size adjustment component (122) adjusts (212) the size of the frames, which may be done in the background so as not to be visible, so that they remain in contact with the borders and neighboring frames. The interactive item size adjustment component (132) adjusts (214) the size of interactive items in the frames, while the interactive item visibility component (134) adjusts (216) the visibility of certain interactive items.

If further predetermined user input is received (208), movement may be influenced thereby. This may lead to further size and visibility adjustments to the frames and interactive items. When a selection input is received (218), an interactive item in a selected frame is selected.

An exemplary implementation of a display and interaction method in a user interface is illustrated in FIGS. 3A to 3D.

Figure 3A:
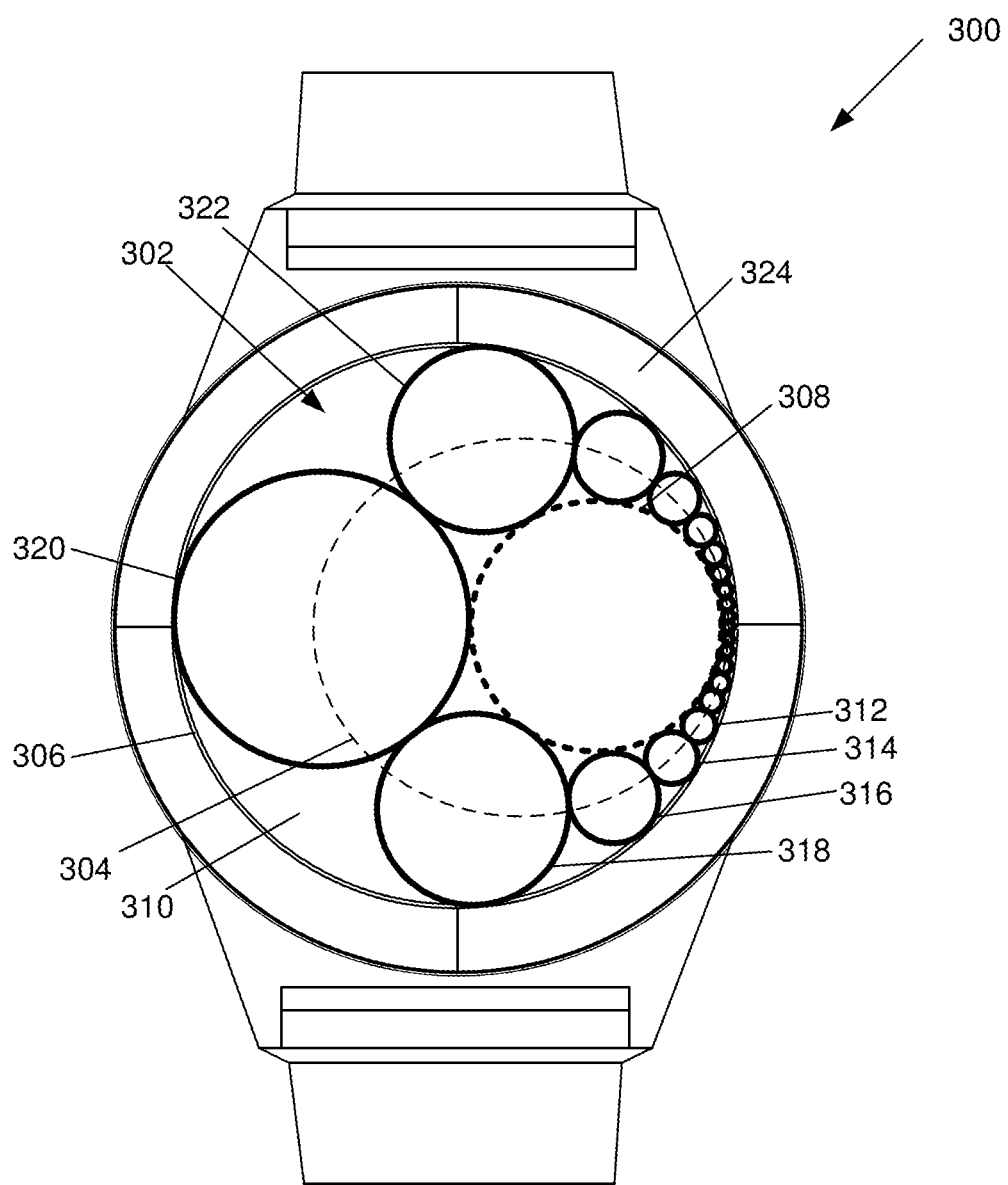
FIG. 3A to 3D illustrate an exemplary implementation of a display and interaction method in a user interface according to the invention.

FIG. 3A shows a smartwatch (300) with a partial exemplary representation of a user interface according to the invention on a circular, touch-sensitive display (302) thereof. A display region of the user interface is provided by the display (302) of the smartwatch. An elliptical track (304) is provided on the display (302), and extends between an outer circular border (306) and inner circular border (308). In the present embodiment, the outer circular border (306) is defined by the outer periphery of the display (302) of the smartwatch (300). The center of the inner border (308) is offset from the center of the outer border (306). The track (304) extends along a path (310) created between the inside of the outer border (306), and the outside of the inner border (308). The track (304) follows the center of the path (310) and is in an elliptical shape. It should be noted that the track (304) and inner border (308) are shown in broken lines. It is envisaged that the track (304) and inner border (308) will not be visible to a user. The lines may merely reside in the background, with the final display shown to the user a result of the use of the inner border (308) and track (304). Similarly, the outer border (306) need not be visible to a user, but may simply be the periphery of the display (302) of the smart watch (300).

A plurality of frames (312, 314, 316, 318, 320, 322) are provided along the track (304). Only some of these frames are numbered. Centers of the frames are located on the track (304). The frames are sized so that each frame is in contact with the outer border (306), the inner border (308), a neighboring frame located in a first direction along the track directly next to it, and a neighboring frame in a opposite, second direction along the track directly next to it. As an example, it can be seen that a current largest frame (320) is in contact with both a first neighboring frame (318) and a second neighboring frame (322). It is also in contact with the outer border (306) and the inner border (308). All other frames are similarly in contact with the borders and their neighboring frames. The frames form what is known as a closed Steiner chain.

FIG. 3A does not show interactive items in the frames. Interactive items are shown in the frames in FIGS. 3B to 3D, which are enlarged views of the display (302).

In the present embodiment, input may be provided to the smartwatch (300) via an operating bezel (324) provided at the periphery of the display (302) of the smartwatch (300). Movement of the interactive items may be initiated by turning the operating bezel (324), as will be described in further detail below. Input may additionally or alternatively be provided via touch-sensitive inputs. The following embodiments are described using the operating bezel (324) as the input component; however, it will be appreciated that this may be replaced or augmented by touch-sensitive user inputs as described below in relation to FIGS. 9A, 9B, 10 and 11.

Figure 3B:
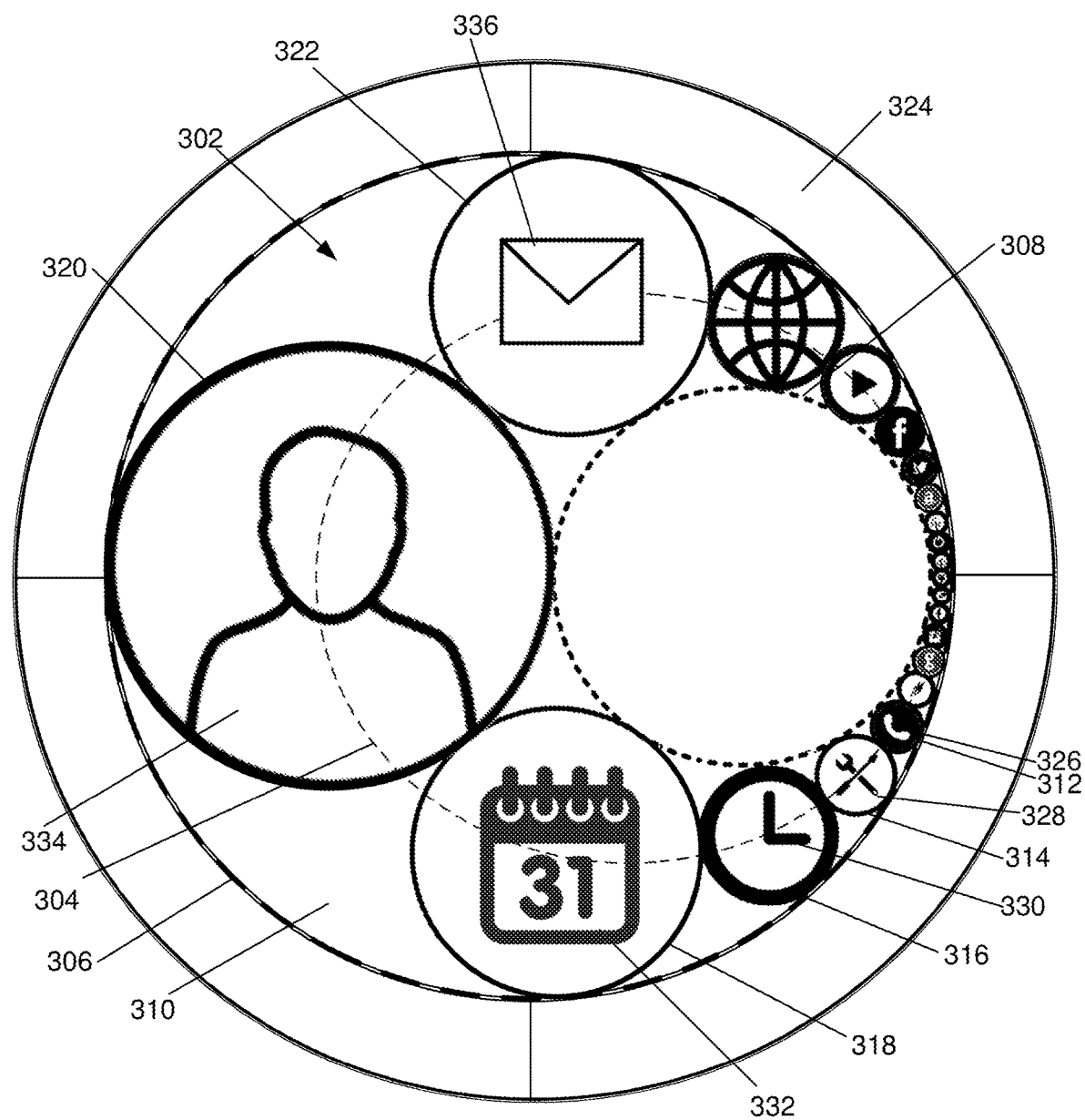

FIG. 3B shows an enlarged display (302) of the smartwatch of FIG. 3A when the display is activated. Like reference numerals in FIG. 3B indicate like items of FIG. 3A. In the present embodiment, the number of frames on the display is 20 frames. This may be a maximum number of frames that can be displayed on the display. The display (302) in FIG. 3B starts out stationary. Interactive items (326, 328, 330, 332, 334, 336) are provided in the frames (312, 314, 316, 318, 320, 322). In the present embodiment, the interactive items are menu icons that a user may wish to select in order to perform a certain function, to access a desired submenu, to access desired information, to open a specific application, or the like.

In this embodiment, the user interface is configured such that the interactive items in the largest three frames are selectable via the touch-sensitive display (302). Presently, the three largest frames (318, 320, 322) respectively include interactive items relating to a calendar application (332), a contacts list (334) and a messaging inbox (336). These interactive items may be selected by touching the touch-sensitive display on the frame with the desired interactive item.

Figure 3C:
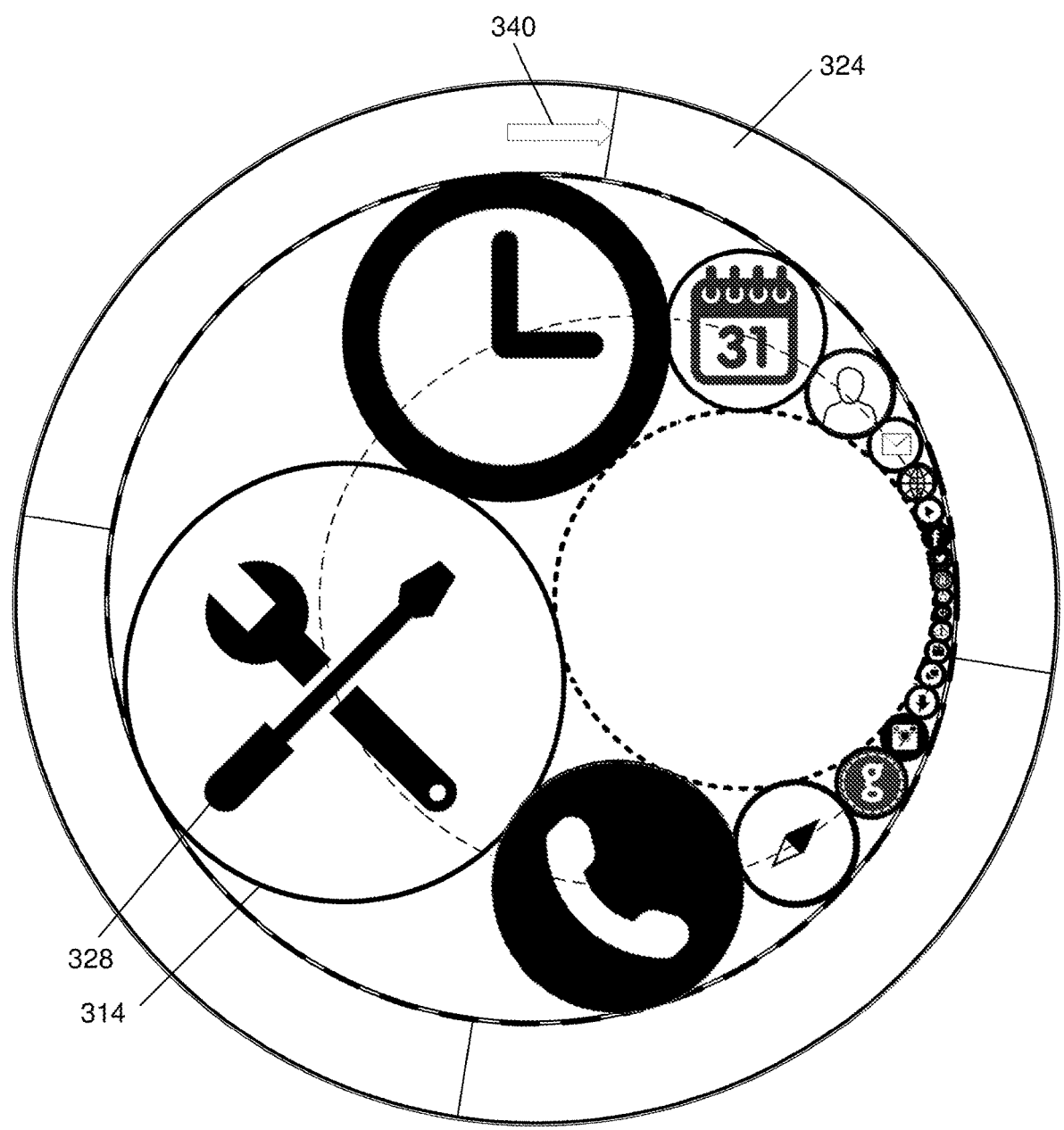

In order to select a different interactive item, for example an interactive item relating to a settings menu (328), the user will need to navigate to that interactive item so that it is selectable and falls within the three frames with selectable interactive items. To navigate the interactive items, a user may turn the operating bezel (324) of the smartwatch (300) to provide an input to the smartwatch, as can be seen in FIG. 3C. The user has turned the operating bezel (324) in a clockwise direction indicated by a directional arrow (340), which causes the frames to move along the track (304) in the same direction. The frames have rotated such that the desired interactive item relating to a settings menu (328) is in one of the largest three frames. It should be noted that the interactive items move along the track within their respective frames. Accordingly, the settings menu interactive item (328) is still located within its original frame. During movement, the frames adjust in size so that they remain in contact with their neighboring frames and the inner and outer borders. The interactive items within the frames adjust in size along with their frames.

Figure 3D:
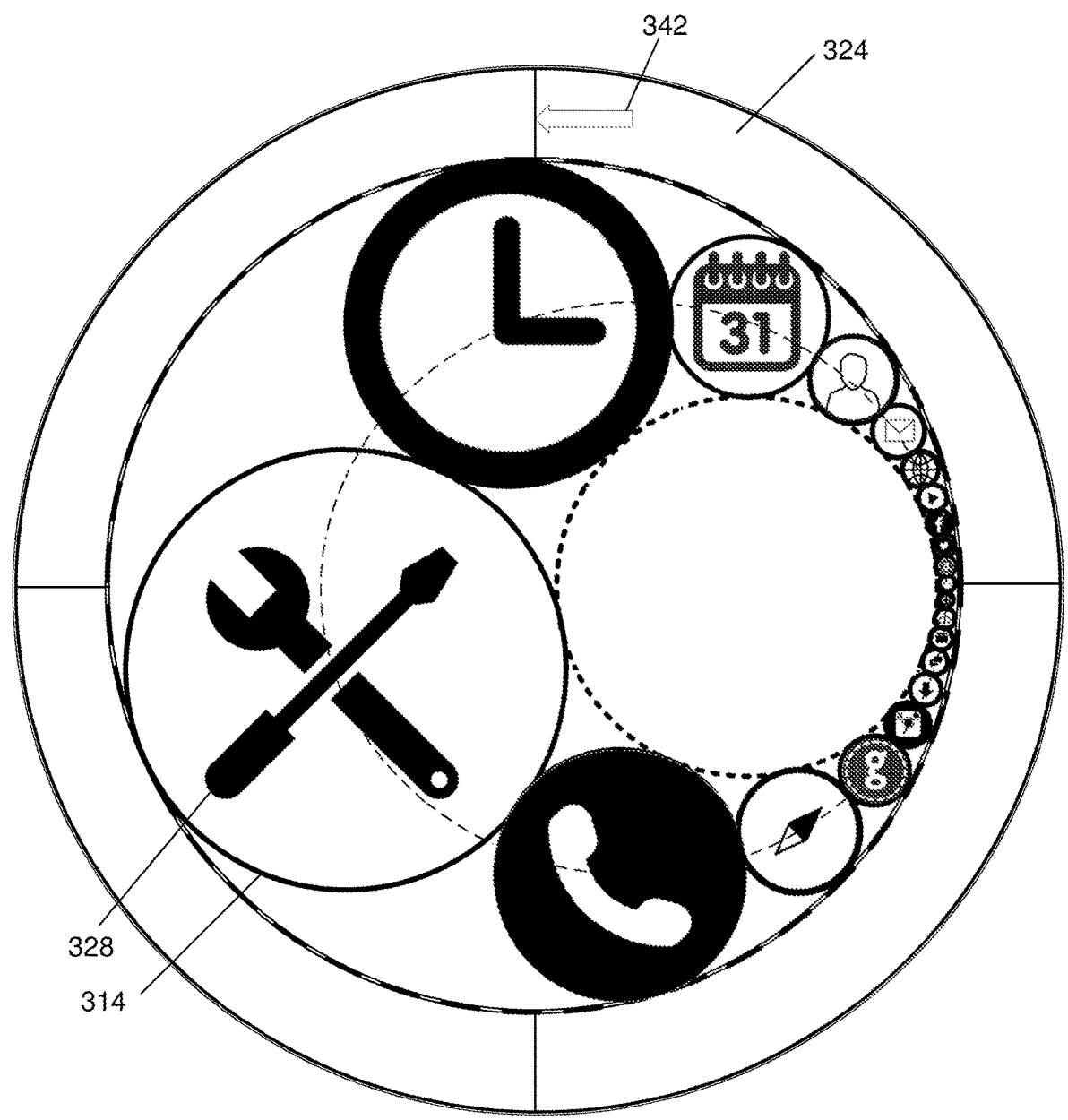

The user may rotate the operating bezel (324) in an opposite, counter-clockwise direction shown by a further directional arrow (342) in order to stop movement of the interactive items. This is shown in FIG. 3D, and may allow the user to more easily select the desired interactive item through the touch-sensitive display. Alternatively, the user may select an interactive item while it is moving along the track within its frame. The user may also move the bezel in a same direction as a current direction of movement in order to speed up movement in that direction. Then, movement in an opposite direction will slow down movement of the interactive items and frames. It should be noted that movement along the track in either direction is possible, and depends on a user's initial input.

As explained above, the frames and interactive items are dynamically resized whilst they are moving along the track. The frames of the present embodiment are continuously resized whilst moving along the track so that they still form a Steiner chain together with the outer border and inner border. The interactive items are resized along with the frames in which they are located.

The display and navigation method explained above may provide a more fluid navigation experience on a small round screen than if a selection indicator were moved between different interactive items. The use of a Steiner chain to resize frames and interactive items may allow for easier navigation through a list of items than if the items were all of a similar size. The above method may allow for the display of more items in a list, for easier navigation due to a user being able to see more interactive items without the need for a paging function, and may provide a more fluid navigation experience.

It will be apparent to a person skilled in the art that many modifications may be made to the embodiment described above without departing from the scope of the invention. Interactive items may be selected in a number of ways. In some embodiments, only the interactive item in the largest frame on the display may be selectable, and selection anywhere on the touch-sensitive display will select that item. In such an embodiment, the largest frame may considered a "primary frame", and selection anywhere on the display will select the interactive item in the primary frame. Alternatively, a selection button or the like may be employed to select an interactive item in a primary frame.

In alternative embodiments, more than three interactive items may be selectable, for example five interactive items located in the five largest frames. In other embodiments, all of the interactive items may be selectable, and a user's ability to select an interactive item will depend on how accurately the user can select the smaller frames on the display. This may however not be practical on small displays. A stylus or similar interaction device may also assist with selection of interactive items.

In some embodiments, more interactive items may be available than can be displayed on the display simultaneously. For example, there may be 60 items.

FIGS. 4A to 4E show an additional embodiment of the invention. A circular display (402) of a smartwatch (400) is again shown. Again, an elliptical track (404) is provided on the display (402), and extends between an outer circular border (406) and inner circular border (408). The outer circular border (406) is defined by the outer periphery of the display (402) of the smartwatch (400). The center of the inner circular border (408) is offset from the center of the outer circular border (406). The track (404) extends along a path (410) created between the inside of the outer border (406), and the outside of the inner border (408). The track (404) follows the center of the path (410). The track (404) and inner border (408) are again shown in broken lines.

A plurality of frames are provided along the track. Centers of the frames are located on the track. The frames are sized so that each frame is in contact with the outer border (406), the inner border (408), a neighboring frame located in a first direction along the track directly next to it, and a neighboring frame in an opposite, second direction along the track directly next to it. The frames of this embodiment again form a closed Steiner chain.

In the present embodiment, interactive items in the form of photos are provided in the frames. Each frame contains a photo. The photos form part of an extensive list of photos, which contains too many photos to allow all of the photos in the list to be shown in the number of frames shown on the display. Only a subset of the list of interactive items are therefore shown on the display at any given time. Presently, numbers in the frames represent the photos forming part of the subset.

Figure 4A:
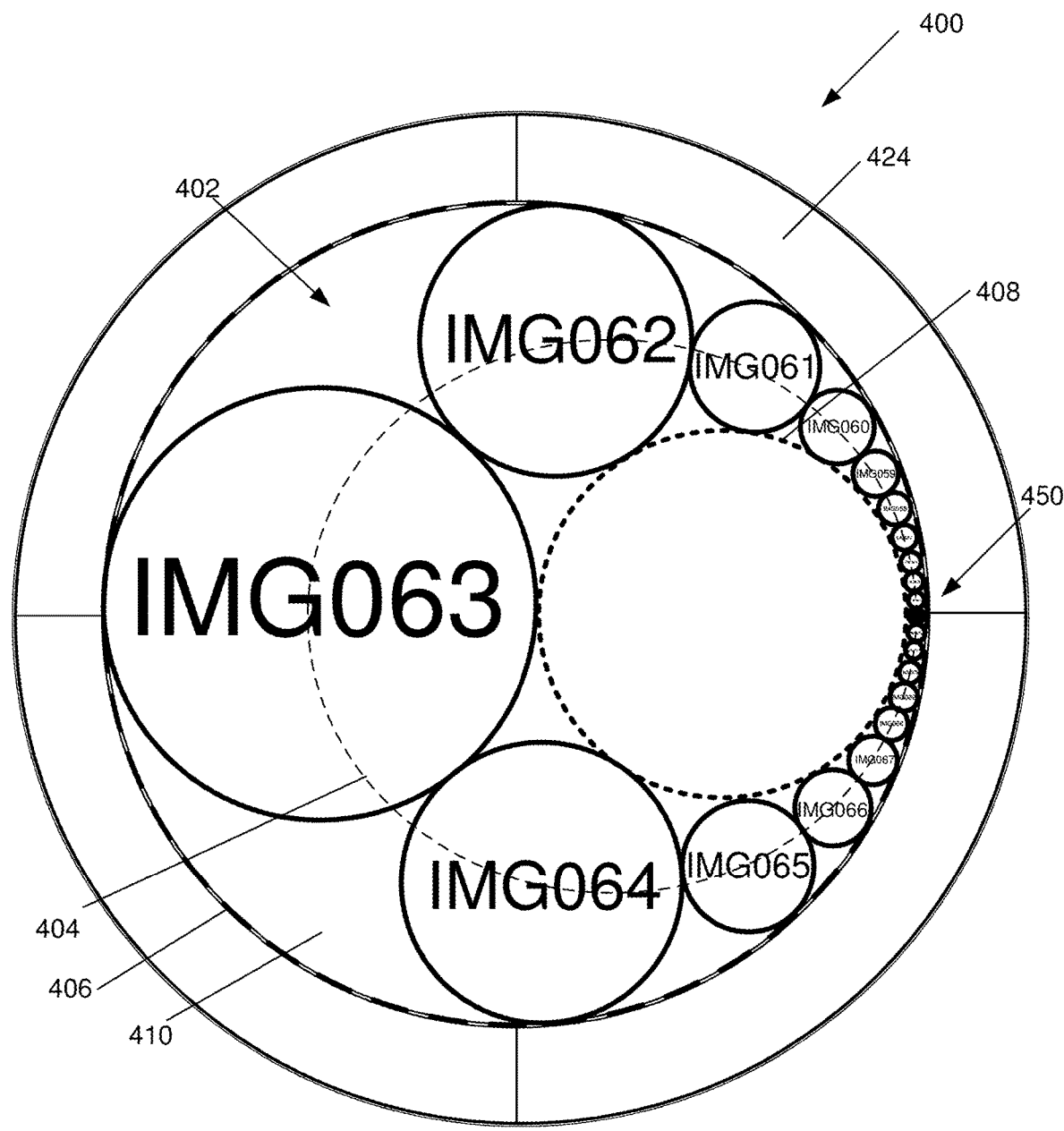
FIG. 4A to 4D illustrate an alternative exemplary implementation of a display and interaction method in a user interface according to the invention.

FIG. 4A shows images numbered IMG054 to IMG072 in various sizes, each in its own frame. These photos form the current subset displayed.

The list of the present embodiment contains 250 items, ranging from photo IMG001 to photo IMG250. In order to navigate to a specific photo, the user will again need to turn an operating bezel (424) of the smartwatch. Navigating to an interactive item within the current subset may take place as was described with reference to FIGS. 3A to 3D. However, in the present embodiment, interactive items do not merely cycle around the display along the track. A transition zone (450) is provided where the subset of interactive items is updated.

Figures 4B, 4C, 4D:
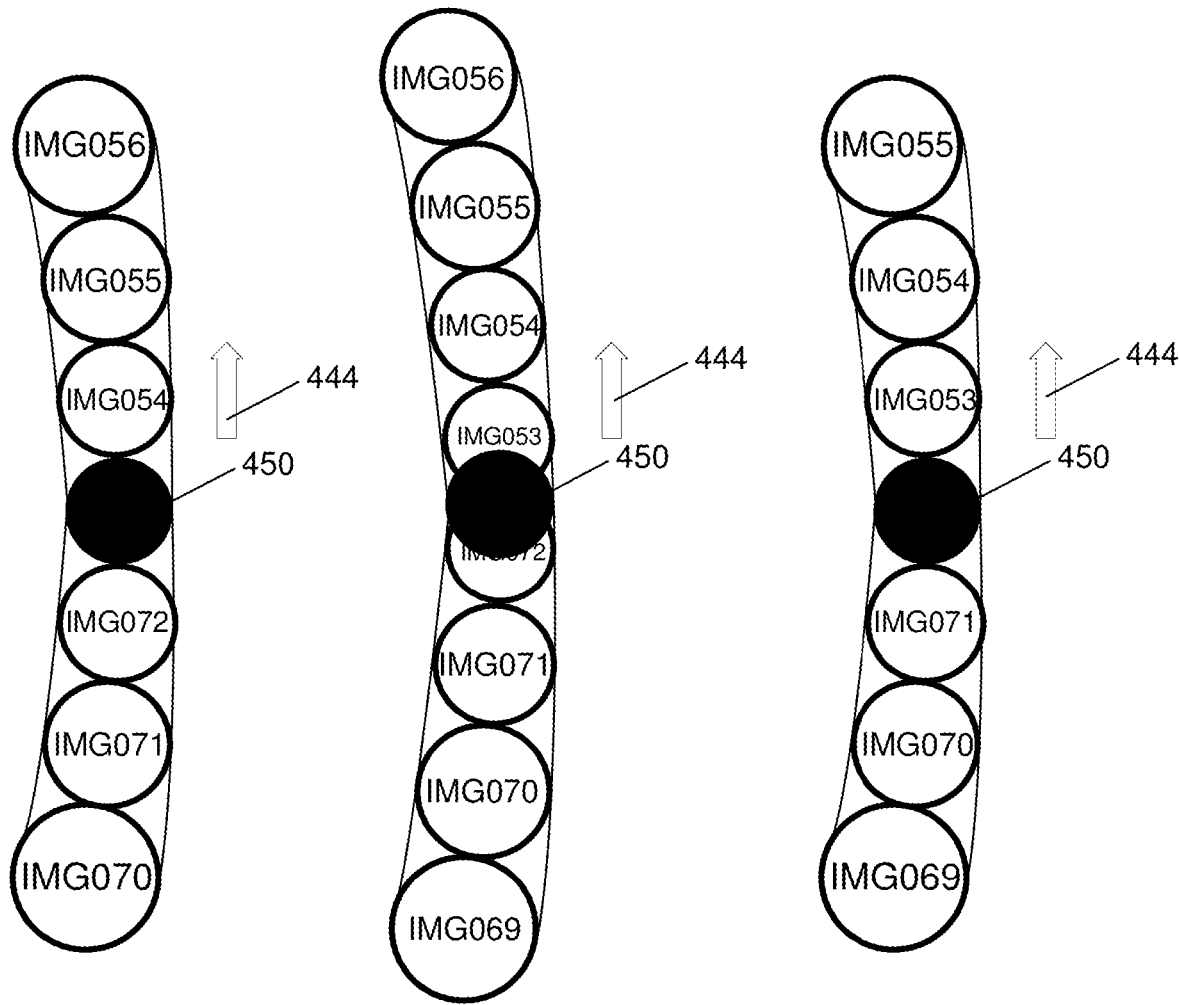

The transition zone (450) is located at a position where a frame will have the smallest size it can be on the display, as can be more clearly seen in FIG. 4B. FIG. 4B shows an enlargement of the smallest frames on the display. The transition zone (450) is blacked out. Instead of merely cycling through the interactive items on the display as per the previous embodiment, the subset of interactive items is updated whilst the frames are moving. As the transition zone is blacked out, the replacement of interactive items in the transition zone is not clearly visible to a user. A frame immediately below the transition zone, containing photo IMG072, contains the interactive item with the highest number in the current subset of interactive items. The frame on the opposite side of the transition zone (450) contains the photo with the lowest number (IMG054). The frame in the transition zone (450) is not visible, as the transition zone (450) is blacked out.

When the operating bezel (424) of the smartwatch (400) is moved counter-clockwise, the frames move in the same direction along the track (404), as indicated by the directional arrow (444). As the frame with photo number IMG072 moves into the transition zone (450), a frame with number IMG053 appears therefrom. The transition zone (450) remains blacked out, as shown in FIG. 4C.

In FIG. 4D, the frame with IMG072 has moved into the transition zone (450), and is now completely blacked out. If movement continues in the same direction, IMG052 will emerge from the transition zone (450) in the frame that IMG072 used to be in. The subset of interactive items in the frames on the display (402) is updated in this manner. The blacking out of the transition zone (450) makes the replacement of interactive items in frames appear to be a fluid action, without sudden jumps in the interactive items shown in frames.

It is also envisaged that frames may gradually become darker as they move towards the transition zone (450), and may gradually lighten as they move away therefrom. This may contribute to a fluid transition experience, as sudden "jumps" in interactive items within a frame may not be easily detected by a user.

Figures 5A, 5B, 5C:
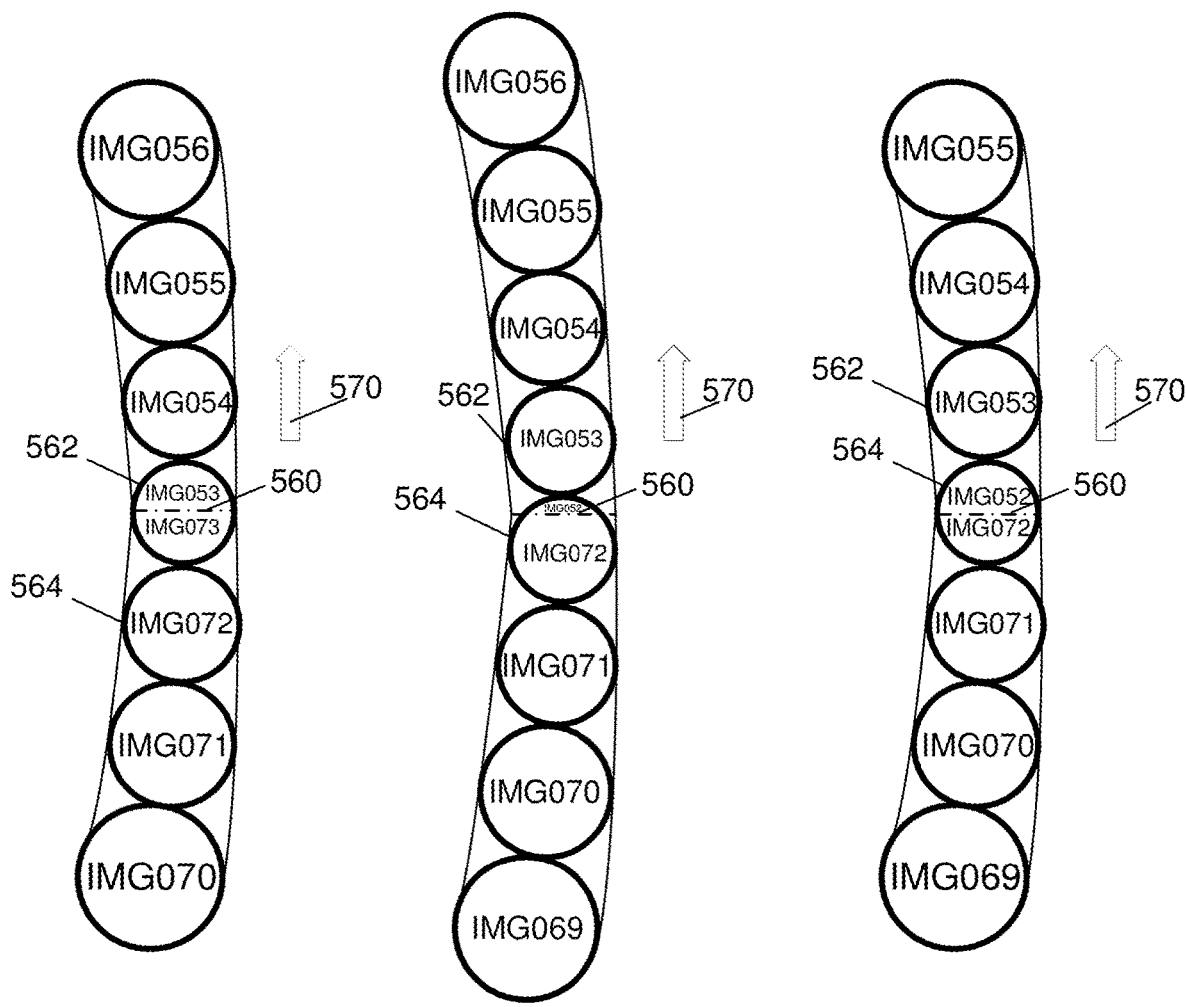
FIG. 5A to 5C illustrate a further implementation of a display and interaction method in a user interface according to the invention.

FIGS. 5A to 5C show an additional embodiment of a transition zone, where the transition zone includes a virtual transition line (560). The same numbered photos are present in this embodiment. When a frame is located such that the transition line (560) bisects it, part of different interactive items appear on both sides of the transition line (560) in the same frame. A first end of the subset of interactive items appears on one side of the line, and a second end of the list appear on an opposite side of the line.

In the present example, in FIG. 5A, the transition line (560) bisects a first frame (562) into two substantially equal parts. IMG054 is in the first complete frame on one side of the transition line (560), and IMG072 is in the first complete frame on an opposite side of the transition line (560). The first frame (562) includes half of IMG053 on the side of the line adjacent IMG054, and half of IMG073 on an opposite side, adjacent IMG072.

In FIG. 5B, IMG053 completely fills the first frame in which it was only partially displayed in FIG. 5A, as this frame has moved completely across the transition line (560) in the direction indicated by the directional arrow (570). IMG073 has been removed from the displayed subset of interactive items. A second frame (564), next to the first frame, is now bisected by the transition line (560). Previously, this second frame only contained IMG072. Now, a part of IMG052 appears in the second frame on the same side of the transition line (560) as IMG053. In FIG. 5C, the second frame is bisected into substantially two equal parts half by the transition line (560), with IMG052 on one side, and IMG072 on an opposite side. If movement continues, the second frame will contain only IMG052, and IMG072 will be removed from the displayed subset of interactive items in the frames. This replacement will continue as frames move along the track.

It is envisaged that the transition zone may be blacked out, as in the embodiment described with reference to FIGS. 4B to 4D. While in the background interactive items will be gradually replaced as a frame moves across the transition line, the blacked-out transition zone may block this from view of the user, contributing to a fluid user interface experience. Additionally, as described with reference to FIGS. 4B to 4C, frames with interactive items may gradually become darker as they approach the transition zone, and lighten as they move away therefrom.

Figure 6:
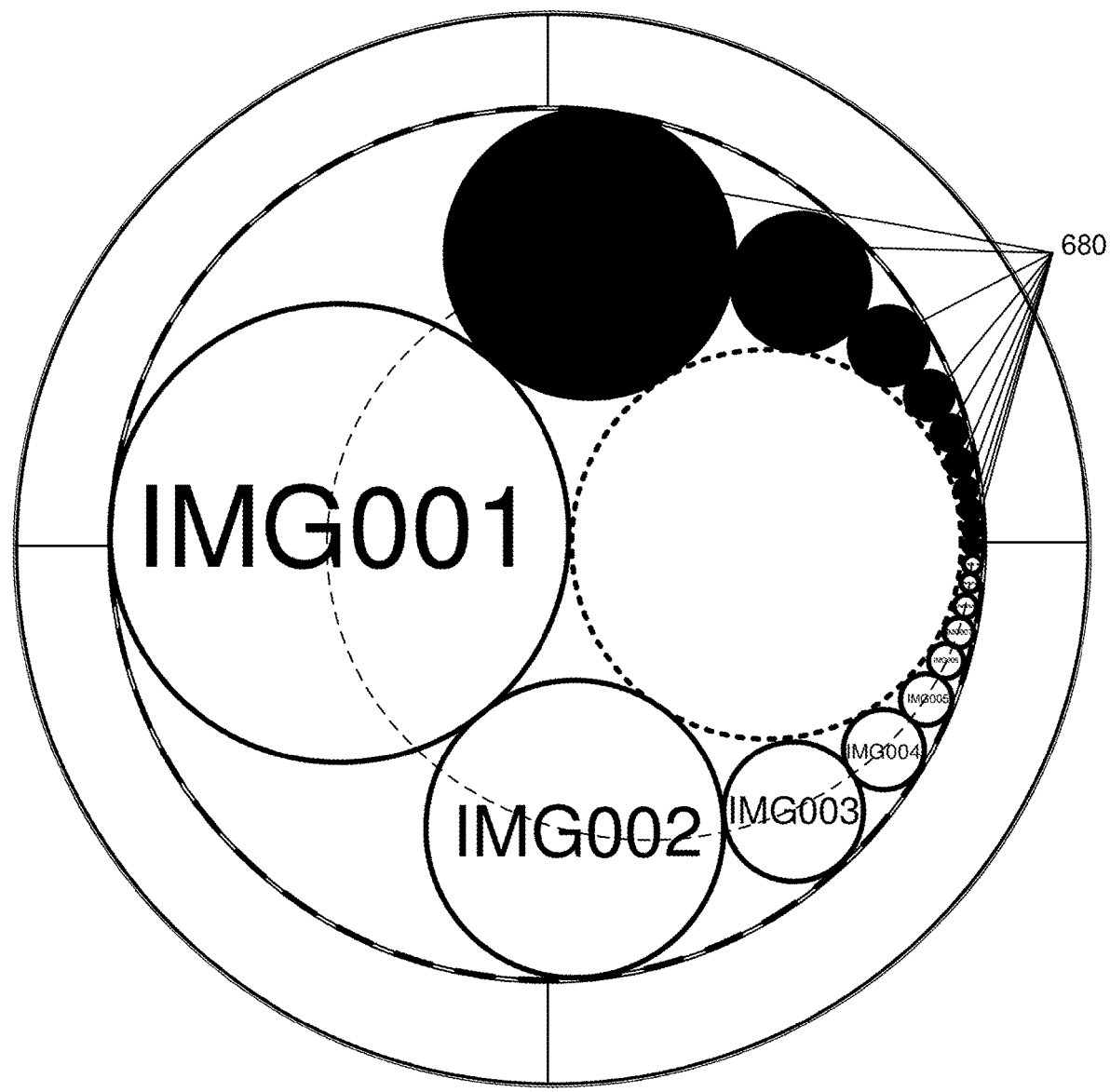
FIG. 6 illustrates a still further implementation of a display and interaction method in a user interface according to the invention.

FIG. 6 shows an embodiment where an end of the list of interactive items has been reached while navigating the list. In this embodiment, frames remain empty as the end of the list is approached, with movement stopped as the final interactive item is reached. The final interactive item is also only allowed to move until its frame has reached its largest size. In FIG. 6, rotation of the interactive items in FIGS. 4A to 4D has continued until IMG001 has been added to the list of interactive items displayed in the frames. No further interactive items have been added to frames. The empty frames (680) are dark to indicate that they are empty. IMG001 and its frame are shown in their largest possible sizes, and movement of the frames has stopped automatically when this size has been reached. This indicates to a user that the end of the list has been reached. Navigation can only occur in the opposite direction, when the operating bezel is moved in a clockwise direction. The empty frames need not be displayed, but may simply be absent from the display.

Figure 7:
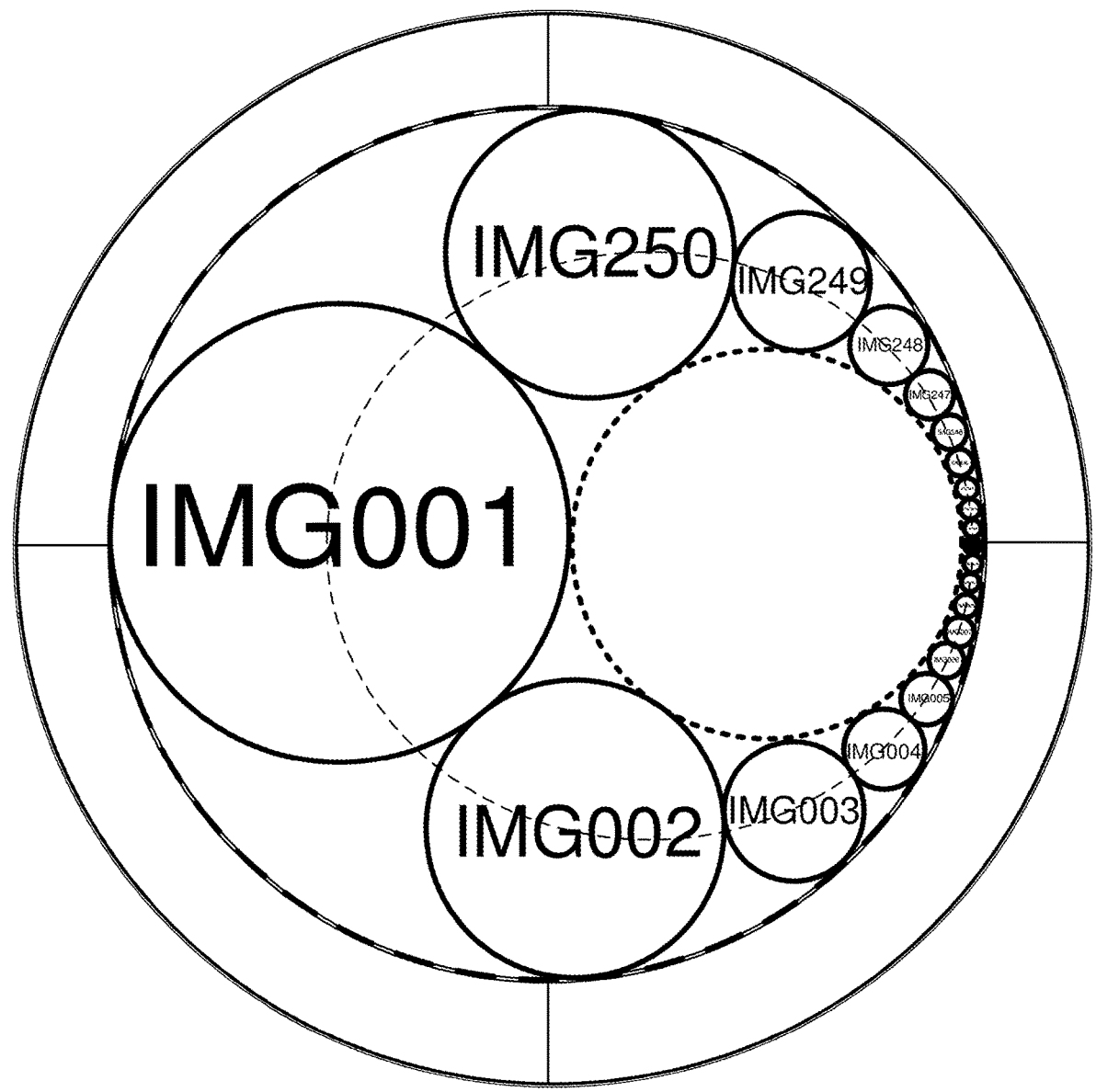
FIG. 7 illustrates a yet further implementation of a display and interaction method in a user interface according to the invention.

FIG. 7 shows an alternative embodiment, where reaching a last item in a list of interactive items causes items at the opposite end of the list to be placed next to the last item. No empty frames are therefore shown. As the current list is 250 interactive items long, IMG0250 is placed next to IMG001, IMG0249 next to it, and so forth. This may allow a user to continuously cycle through a list of interactive items without the requirement to navigate through the whole list to reach an opposite end of the list.

Figure 8:
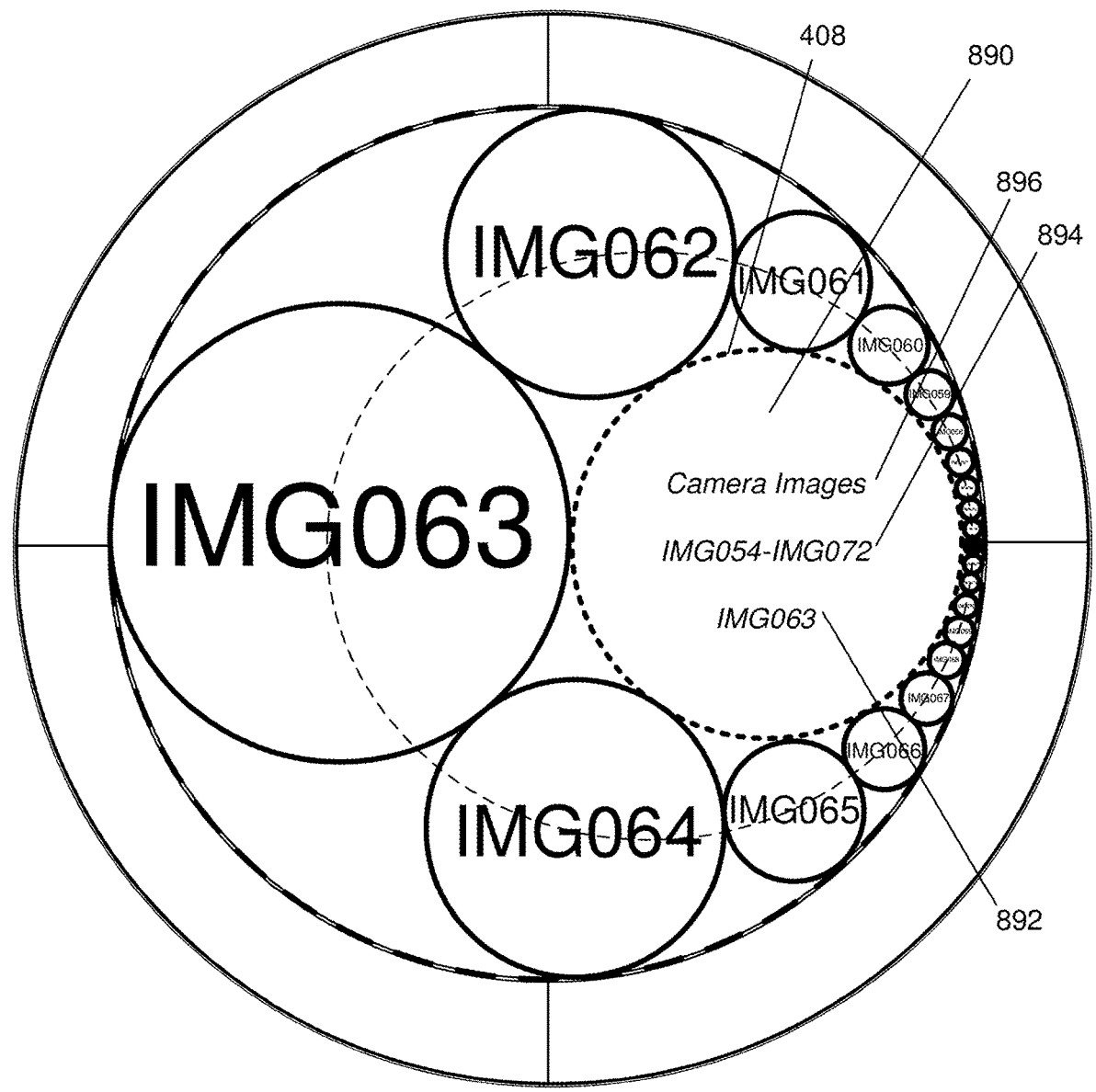
FIG. 8 illustrates a further implementation of a display and interaction method in a user interface according to the invention.

FIG. 8 shows an embodiment where a central region inside the inner boundary (408) is used as an information display space (890). The remainder of FIG. 8 is the same as FIG. 4A above. The information display space (890) may include information relating to the interactive item in a current largest frame, to the list of interactive items, to the subset of interactive items, or the like. In the embodiment shown, the information includes a title (892) of the current interactive item in the largest frame, a range of numbers (894) of interactive items currently forming part of the subset of interactive times, and a title (896) of the current list of interactive items. It should be noted that any similar information may be displayed in the information display space (890).

Direct manipulation of virtual items on a small touch-sensitive display may become problematic when a finger of user, used to interact with the interactive items, occludes a significant fraction of the screen. This typically happens in the case of a smartwatch with diameter on the order of 30 mm. The relatively small screen size also limits the number of items that can be visually distinguished and reliably selected by tapping. A rotating bezel keeps the user's fingers off the screen, and bezel movements can either be mapped to the position of the items or to the rate of rotation. Additionally or alternatively, gestures on the screen may be detected to initiate rotation, with kinetic behavior if desired. A minimal speed controller strip on the screen or elsewhere on the watch is a third possibility. Selection may be done as usual by tapping directly on the item or by pressing a button; the latter will select the item in the largest circle.

It will be apparent to a person skilled in the art that various methods may be employed to receive user input from an electronic smartwatch. Instead of an operating bezel, an operating button, an operating switch, operating crown, or the like may be provided. In at least some embodiments may user input be received directly via the touch-sensitive display, with a user moving the frames and interactive items via touch movement on a display of the smartwatch. This may allow clutching or flicking of the frames to induce movement of the frames along the track. A combination of bezel operation and touch-sensitive display operation may also be used.

A first mode of touch-sensitive display operation is described in the form of a touch and rotate operation. The first mode of touch interaction moves the frames along the track in response to a rotating touch input on the touch-sensitive display or a rotation flicking gesture on the touch-sensitive display in the desired rotation direction. The rotating touch input causes the frames to rotate at a constant speed or near constant speed with gradual deceleration. For a description of the first mode of touch interaction, an asymmetric Steiner chain display is used, and only two or three items are displayed large enough for proper view and convenient selection. The remaining items are typically much smaller or even out of sight. Despite this, all of the items may be quickly and easily rotated and scaled into a zone where interaction with the items is possible in a smooth and efficient way.

The rotation of the frames around the track is controlled explicitly by a user touching the display and rotating their touching finger or pointer in a movement corresponding to the circle basis of the display. The user may rotate their finger or pointer in either direction and at a speed they wish, while scaling follows from the Steiner-related property of the chain. The user may stop the rotation when they wish and touch one of the interactive items to select it, usually one of the larger interactive items currently displayed.

As an alternative in this first mode of touch interaction, the user may make a flicking touch gesture in a rotation direction in order to start the rotation of the frames in the display. The rotation may be stopped by touching the display and selecting an interactive item. The rotation may be at a constant speed or may have a slight deceleration in order to stop the rotation if no further touch is received.

This first mode of touch interaction provides a one dimensional navigation control with continuous, simultaneous and coordinated moving and scaling of all frames. Emphasis is on user control of the motion rather than computer animation. There is also no need for clutching using this mode. Clutching is where repeated gestures or actions of input are required in order to keep scrolling. In this case there is no need for clutching as the frames continue to rotate at a constant or near constant rotation until the user again touches the display.

Figure 9A:
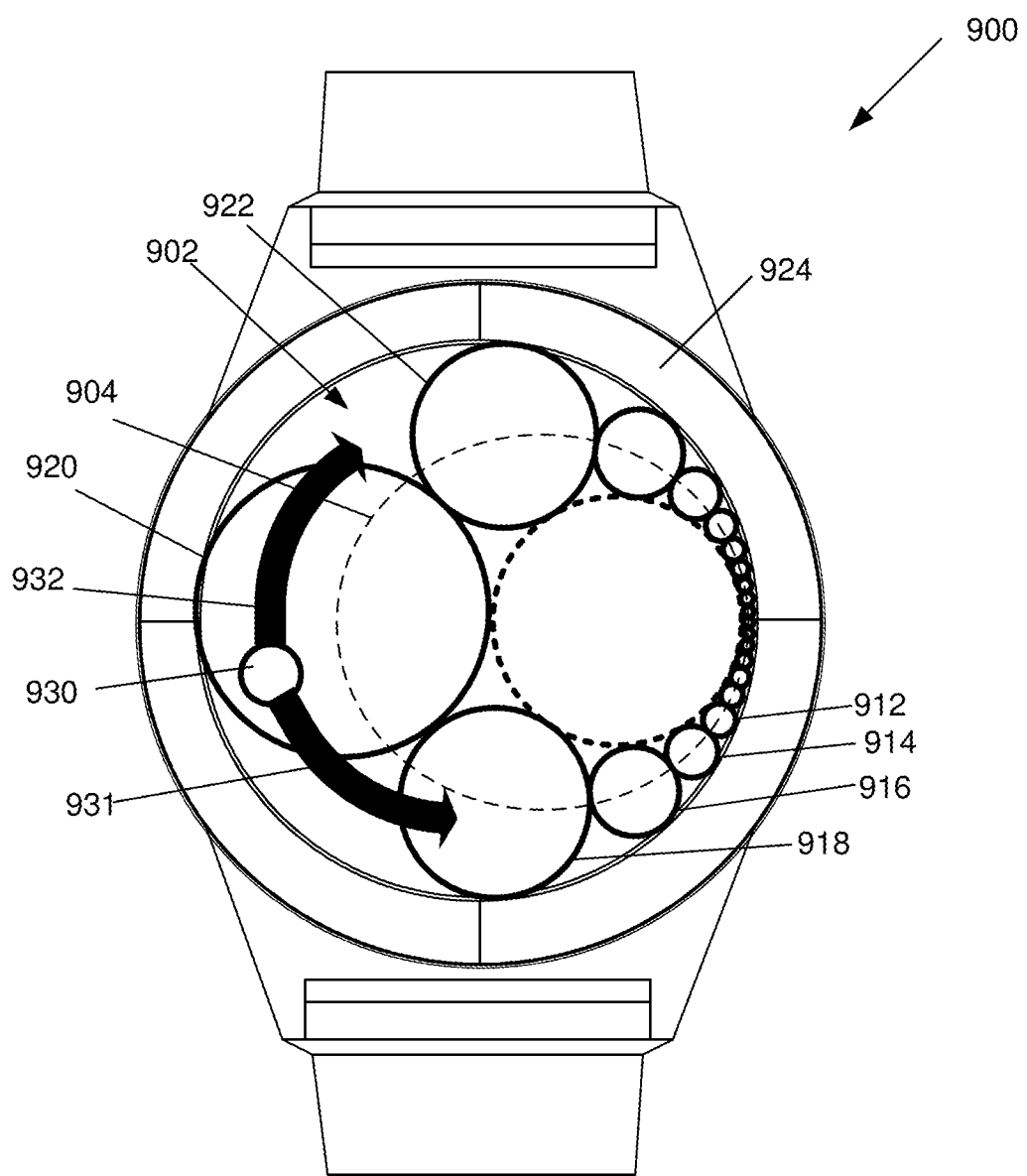
FIG. 9A illustrates a still further implementation of a display and interaction method in a user interface according to the invention.

FIG. 9A shows a smartwatch (900) with an exemplary representation of a user interface on a circular, touch-sensitive display (902) thereof. A display region of the user interface is provided by the display (902) of the smartwatch. The display may display a plurality of frames (912, 914, 916, 918, 920, 922) along a track (904). The centers of the frames are located on the track (904) and moveable around the track (904) as described in relation to FIG. 3A. FIG. 9A shows an example touch-sensitive display with schematic illustration of the first mode of touch interaction.

FIG. 9A illustrates the first mode touch interaction as a touch (930) which may be rotated whilst on display in a clockwise direction (932) or anti-clockwise direction (931) or flicked in the rotation directions (932, 931) to start a generally constant speed of display rotation. The display rotation moves the frames (912, 914, 916, 918, 920, 922) along the track (904). The generally constant speed may gradually decelerate so that the display comes to a stop if no further interaction is received. This may simulate inertia, as the movement gradually slows down. An interactive item based in a circular frame of the display may be selected during rotation by a further user touch input on a selected interactive item. A benefit of the first mode of touch interaction described is that there is no frame occlusion, as the user's finger does not block the display of the interactive items. This may be particularly true with the flick touch gesture aspect in which the user removes his finger from the display.

If there is a constant number of interactive items in the display, for example if there are enough frames in the display to accommodate all the required interactive items, then the interactive items may rotate repeatedly around the track in a cyclical frame movement. If there are a greater number of interactive items compared to the number of frames in the display, then a transition zone may be provided at a point within the smallest frame in which an interactive item is replaced by a new interactive item. In this arrangement, the transition zone may result in a smooth transition and flow through a large number of items. There is no methodical limit to the number of interactive items which might be displayed.

A second mode of touch-sensitive display operation is described in the form of a speed control option. This may be used as a stand-alone input mode or in combination with the first mode of touch interaction and/or the bezel input. In the second mode of touch interaction a touch input provides a non-linear speed control of the speed of rotation of the frames along the track. The second mode of touch interaction provides a one-dimensional speed control for the rotation of the frames around the track of the display. The one-dimensional speed control provides a center point with two opposing directions extending from the center point in a line or curve. The speed control may be provided in a distinct area of the touch-sensitive display such that it may be used in addition to other touch-sensitive control inputs.

Movement of a user's touch along the line or curve away from the center point increases the speed of rotation of the frames in the display in a non-linear manner. This enables an accurate control of small differences at low speed, and high speed where it is possible to move very fast while retaining complete control. This provides kinetic control of continuously variable speed, in order to be intuitively usable on a touch-sensitive display device.

Figure 9B:
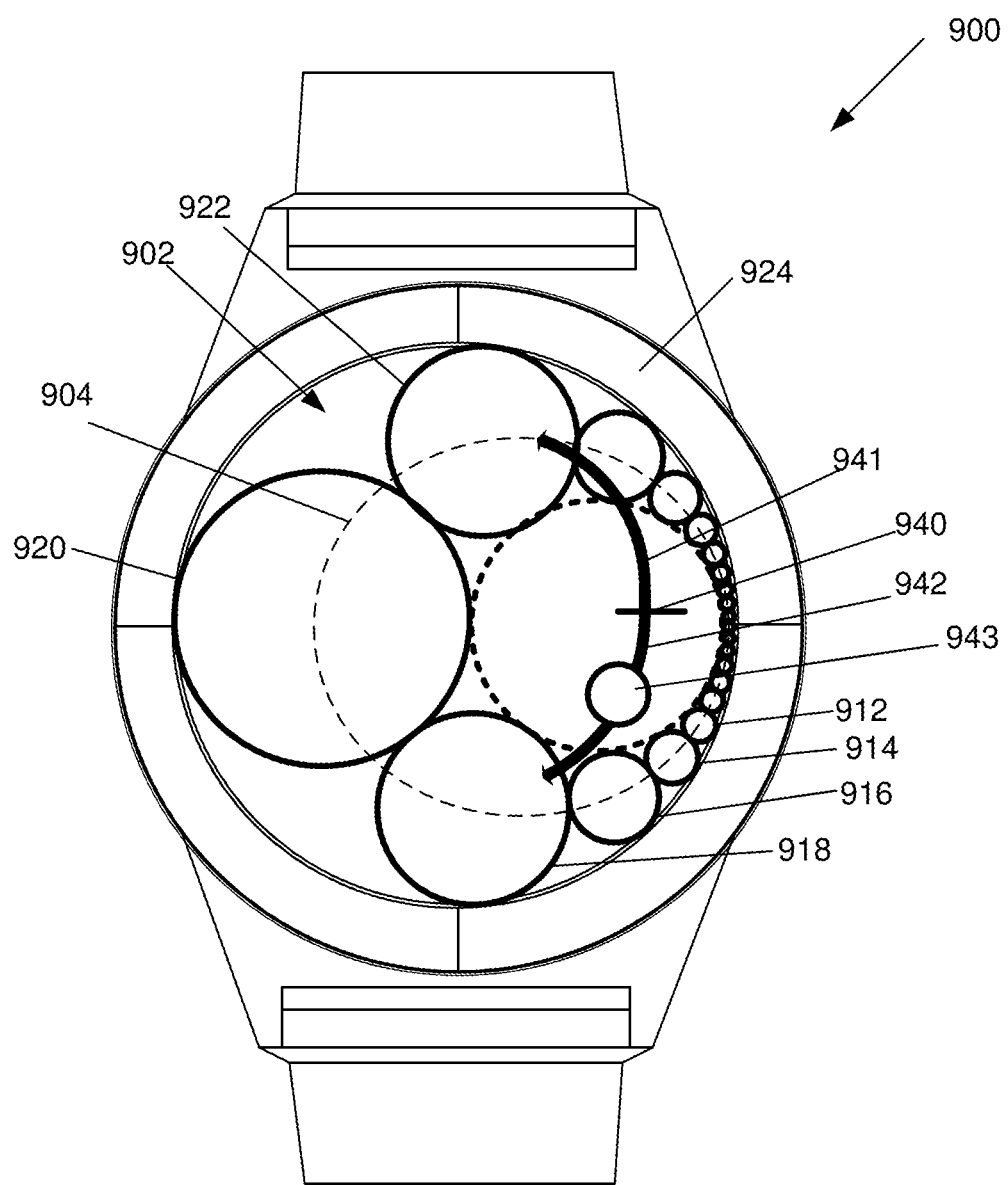
FIG. 9B illustrates a yet further implementation of a display and interaction method in a user interface according to the invention.

FIG. 9B shows an example touch-sensitive display with schematic illustration of the second mode of touch interaction. The display as described in relation to FIG. 9A is shown. The second mode of touch interaction provides a one-dimensional speed control for rotation of the frames (912, 914, 916, 918, 920, 922) along the track (904). In the described example, the one-dimensional speed control is provided as an arc extending in a first direction (941) and an opposing second direction (942) from a center point (940). A user touch (943) on the arc varies the speed of rotation in a non-linear manner with slower speeds in each direction closest to the center point (940) and increasing speeds provided as a user's touch moves along the arc away from the center point (940) in either direction. It is envisaged that a user's touch and movement in the general location surrounding the arc may be projected onto the arc and interpreted as movement along it.

The speed control may allow a user to stop quickly and completely, starting from any speed. The response to control may be perceived by a user as smooth throughout. Forward and backward speed control are mirror images. Unintentional jitter in finger position should not change the speed. The speed may continue unchanged when the touch contact is made or broken. Only relative touch movements may be used to control the speed. The speed of rotation is not proportional to the touch movement, and details of the non-linear function mapping touch movement are provided below.

Once speed control has been initiated by touching down on the area of the speed control, the touch point may be moved outside it without losing control. The speed may be sustained after a lift, and not appreciably affected when touching down again. The kinetic speed control movement may be up and down the display or on an arc and one dimensional. It is envisaged that the center point may be variable, and may be allocated as a first position of touch on the display.

Furthermore, it is envisaged that the second mode of operation may be suitable for individual use. This may be particularly useful to control a one-dimensional parameter in a non-linear manner, and may be particularly useful to control a parameter that may be visualized in a rotating manner. It will be apparent that touch-control need not be provided to allow use of the second mode of touch operation, but that a lever, such as a joystick, may be equally well employed to provide this mode of operation.

Figure 10:
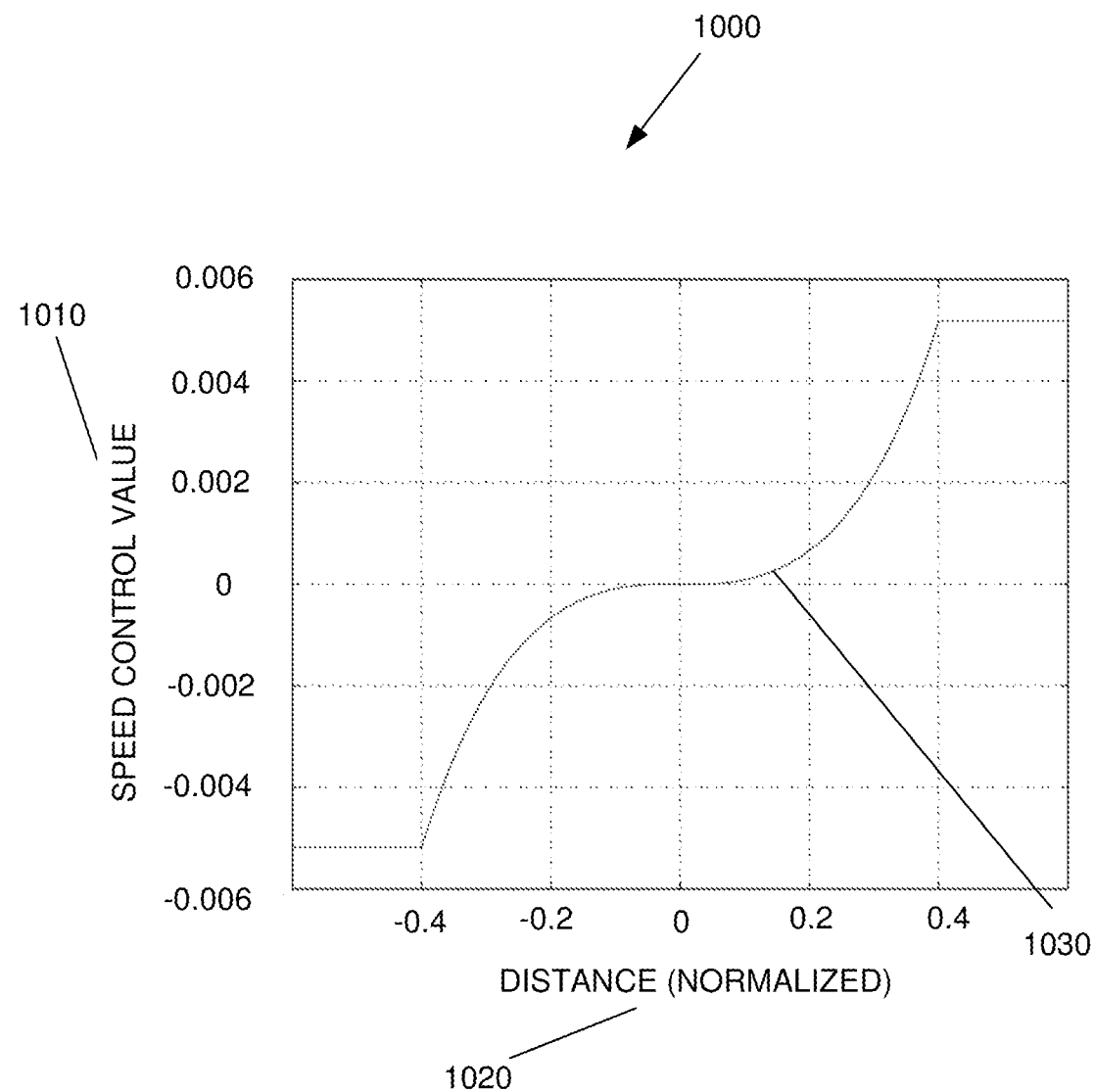
FIG. 10 illustrates a graph showing a non-linear speed control of the display in accordance with an aspect of the invention.

FIG. 10 shows a graph (1000) of an example implementation with the speed control value (1010) as function (1030) of touch movement distance (1020). Note that the slope of the function (1030) is zero at the origin and that its value itself is zero over a finite range [−0.03, 0.03] around the origin. The function is also clipped at absolute arguments larger than 0.4.

The shifted equation of the positive part has the form:

$$v = cx^2 e^{dx}$$

where c and d are parameters that are adjusted for an example implementation.

The operating system built-in measurement of the touch position returns a centroid of the touch area. When lifting the finger serving as pointer, this position may move unintentionally due to the deformation of the finger. A possible workaround may be to save all inputs and to reverse the last few speed changes once a pointer lift has been detected to eliminate such deformation influence. A similar argument may be made for pointer placement. While not preventing the user from clutching during navigation, speed control may eliminate the need for it. Speed control may be relatively easy to use and may enable both fine control at low speeds and long distance scrolling at high speed.

Figure 11:
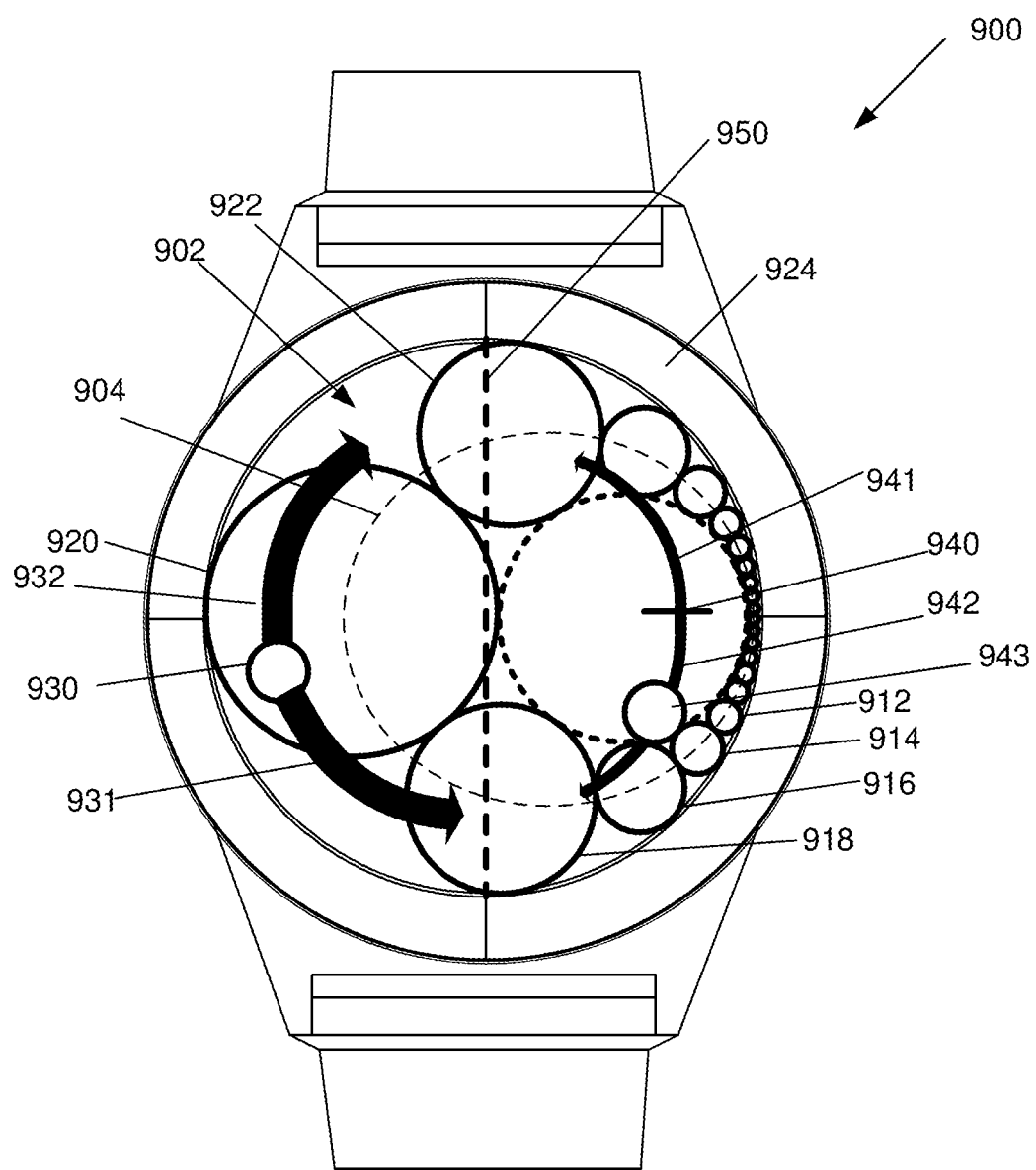
FIG. 11 illustrates a further implementation of a display and interaction method in a user interface according to the invention.

FIG. 11 shows an example touch-sensitive display with a combined use of the first and second modes of touch interaction shown in FIGS. 9A and 9B. The user input may include a combination of the first and second mode of touch interaction and a first touch of a user on an area of the touch-sensitive display designated for activating one of the first or second mode of touch interaction activates that mode of touch interaction. In FIG. 11, an area for first touch for activating the first mode of touch interaction is the left half of the touch-sensitive display illustrated as divided by the dashed line (950). An area for first touch for activating the second mode of touch interaction is the right half of the touch-sensitive display.

It will be appreciated that the areas are not required to be equal and may be at different orientations within the display. The second mode of touch interaction may be provided to the right of the display for easy and quick interaction with a finger of a right hand when a smartwatch is on a left wrist and vice versa if a smartwatch is worn on a right wrist. An indication of the current mode of touch interaction in use may be provided in the form of an icon or visual indication on the display. The indication may also include an indication if the current user input mode is via a bezel input control.

As an example implementation, an application may be provided which may be in the form of a web application or native application. Alternatively, the functionality may be provided as part of an operating system of a device. Example applications include an application launcher in which the interactive items are application icons, an emoticon or ideogram selector, an image browser, a contact selector, etc.

An example of an application launcher may have a chain of 20 frames and an asymmetry that will allow direct interaction with 2 to 3 frames. The smallest frame almost vanishes in size, exactly at the point where it serves as both a sink and a source of items. The open area enclosed by the chain may be used to display the name of an application whose icon is currently in the largest circle. The chain rotation rate may be controlled in steps with the bezel or by touch-sensitive control using the first and/or second touch interactions described above. A tap on any icon may launch its associated app, and a tap in the enclosed area may launch the app currently in focus.

When an app is launched, a brief animation may grow its icon to occupy the whole display, before switching to the first app display. On exiting the app, the full screen icon may reappear and the reverse animation returns the launcher to the state in which it was before the launch. These animations serve to preserve visual context for the user.

It is envisaged that the present invention may be suitable for a selection of specific characters to be sent as part of a text message. If, for example, the interactive items are emoticons, a user may navigate the emoticons in a suitable manner as explained above. Rotation of the chain is again controlled with the bezel and/or touch interaction and an emoji is picked by tapping on it. The chain need not be stationary for picking to work, and it is not stopped by doing so. A buffer may be provided associated with the display, and a user may be allowed to add multiple emoticons to the buffer and perform a send action to transmit the emoticons as part of a message. An information display zone may be used to show one or more emoji that has already been picked and that are in the buffer. When this functionality is provided on a smartwatch, a user may reply to a message using only emoticons, rather than attempting to select individual alphanumeric characters of words on the smartwatch. A left-swipe in the information display zone area may implement backspace, removing the last character from the buffer. Tapping in the information display zone may exit the selector, sending the buffer as a message. This may be sent to a keyboard application for further use.

Touch interaction techniques may achieve effective interaction with a large number of content items on a small round screen. The learning curve to master use of the application may be minimal.

While the chains in the example applications may have 20 frames in the track of the display, there may be more items in the set, for example 60 emoticons in the set. It will typically take longer on average to get to the desired item when the total number of items increases, but interaction with 200 items or more may still be practical.

The described display and interaction method provide for interactive items to swirl around and smoothly change their sizes, enabling relatively easy viewing and selection of the larger sized interactive items. The interactive items may be controlled to continuously glide through the user's focus. The user may be empowered to control the movement and selection. The interactive items may be switched in a smallest circular frame in order to provide additional interactive items for display where the number of interactive items exceeds the number of frames displayed at a given time.

An interactive item may be animated to maximize from its position when selected. This may include that the interactive item grows until it covers the entire display or the area enclosed by the outer border. In some embodiments, a return, back or undo function may be provided, and the maximized interactive item may be animated to its previous position in the frame again when this function is selected. This may provide a visual orientation to a user with respect to the selected interactive item's context.

The above embodiments describe and illustrate only use of a circular smartwatch with a circular display as a device on which the method and system may be implemented, but it will be apparent to a person skilled in the art that the present invention may be employed on multiple alternative electronic devices. Although the method and system are particularly suited for use with small, round, electronic displays, it may be used on any display. For example, if the display method is employed on a rectangular display screen, it may free up space on the display outside the chain of circles to display alternative applications, information, or the like, or may simply remain blank. Additionally, while only circular frames, outer and inner borders were described and illustrated above, the system and method may be equally well used with elliptical frames, outer and inner borders, with a major and minor axis of different lengths. This will allow the display to fill up a rectangular screen to a greater extent than a display with circular inner and outer boundaries and frames. Mapping the chain's central ellipse to a curve or a line may be another way to adapt the method to rectangular displays and larger scales.

For devices that do not allow direct interaction, for example personal computers, laptops, television screens or the like, user input may be provided via any alternative means. For example, an external input component such as a keyboard, mouse, remote control or the like may all be used to provide the necessary input. These devices may typically be external of the actual display.

Figure 12:
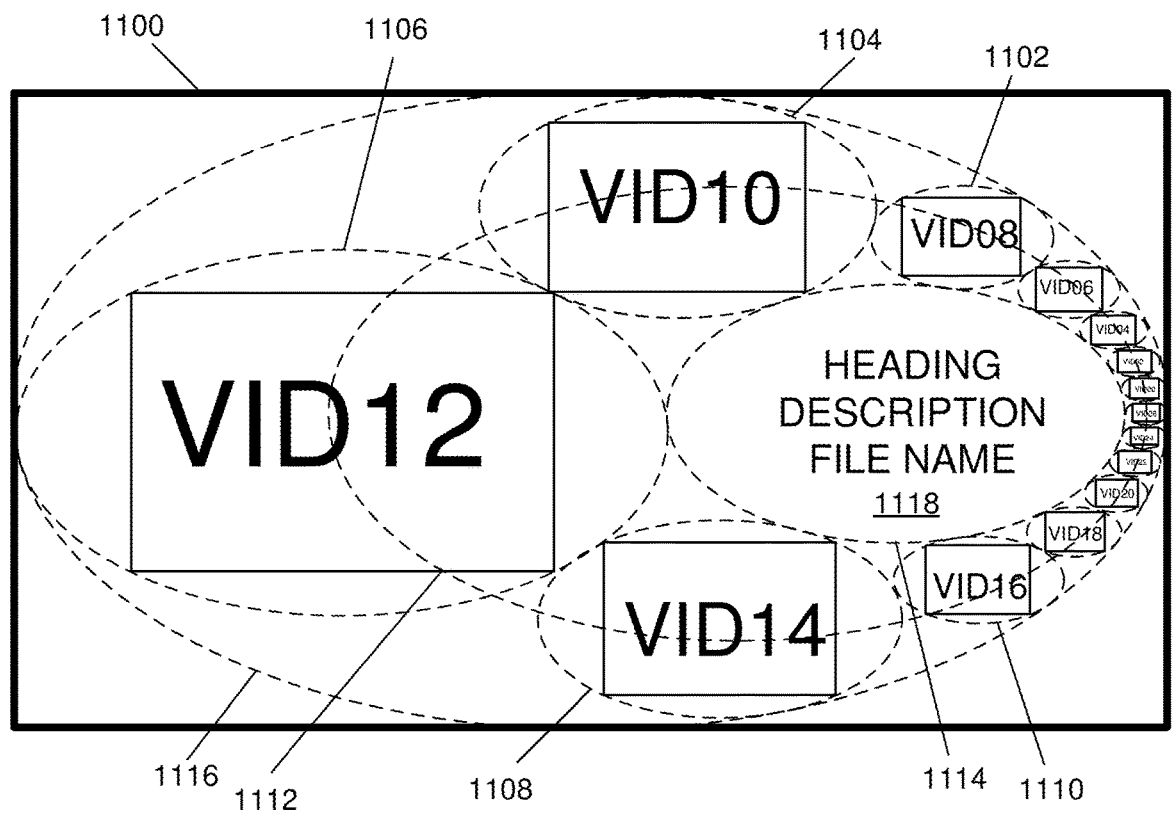
FIG. 12 illustrates an implementation of a display and interaction method in a user interface according to the invention on a rectangular display.

FIG. 12 shows an embodiment where a rectangular screen, such as a computer or television screen, oriented in a landscape manner, is used as a display (1100) for the method and system. A plurality of elliptical frames (1102, 1104, 1106, 1108, 1110) are provided on the display along an elliptical track (922). Not all of the frames are numbered. An inner boundary (1114) and outer boundary (1116) are also provided, as in the previous embodiments described above, and which border the frames. A track is defined between the inner and outer boundaries. The outer boundary (1116) abuts all four sides of the rectangular display (1100). The display of FIG. 12 may operate in exactly the same manner as the displays of FIGS. 3A to 11.

In the present embodiment, interactive items provided within the frames are videos. The videos are represented by alphanumeric digits, and VID08, VID10, VID12, VID14 and VID16 are clearly visible, with the elliptical frames hidden from view and therefore shown in broken lines. Videos are typically rectangular in shape, with the result that the ellipses of the present embodiment may be more suited to fit videos therein than circular frames. Video may be shaped so that corners of video frame lie on the boundaries of the frames, or so that the corners of the videos are cut off and so that the video fills the entire frame. Upon a selection action performed on any of the interactive items, the specific video may maximize, enlarging and filling the whole rectangular screen. It is further envisaged that all or some of the videos may play as they move along the track. In one embodiment, only the largest five videos may play simultaneously as they are displayed. This may provide a user with a preview of a number of interactive items. Information about some of interactive items may be displayed in an information display space (1118) within the inner boundary (1114). This may be a current heading description, such as a directory name, a file name of the interactive item in the largest frame, or the like.

It will be apparent that other multimedia items, such as photos, may be displayed in the same manner as the videos of FIG. 12. Different types of multimedia files, typically a mixture of videos and photos, may be similarly displayed. It will be apparent that the videos may play as they move along the track, while the photos will remain stationary images. Videos may be directly streamed from an online source. This may allow navigation of a video on demand system, with introductory clips or preview videos of a specific show, movie or the like playing as the frame containing such interactive item moves on the track. Hierarchies may also be navigated, as explained further below. In a hierarchy embodiment, a preview or overview of a show containing multiple episodes may be displayed in a higher level hierarchy before selection of the interactive item containing such preview displays the individual episodes, seasons or the like. Selection of a first interactive item, which defines a main hierarchy heading, may bring up related, sub-heading interactive items. These sub-heading interactive items may be replace the main hierarchy headings in the display, so that the sub-heading hierarchal items fill the entire display. A return, back or undo input performed by a user and received by the system may cause reverse navigation through the hierarchy, with a previous main heading interactive item then replacing presently displayed sub-heading interactive items in the display. This may allow a user to navigate through files and folders. Additionally, related interactive items may be grouped in such main and sub-heading groups, and may be navigated with the present method.

Figure 13:
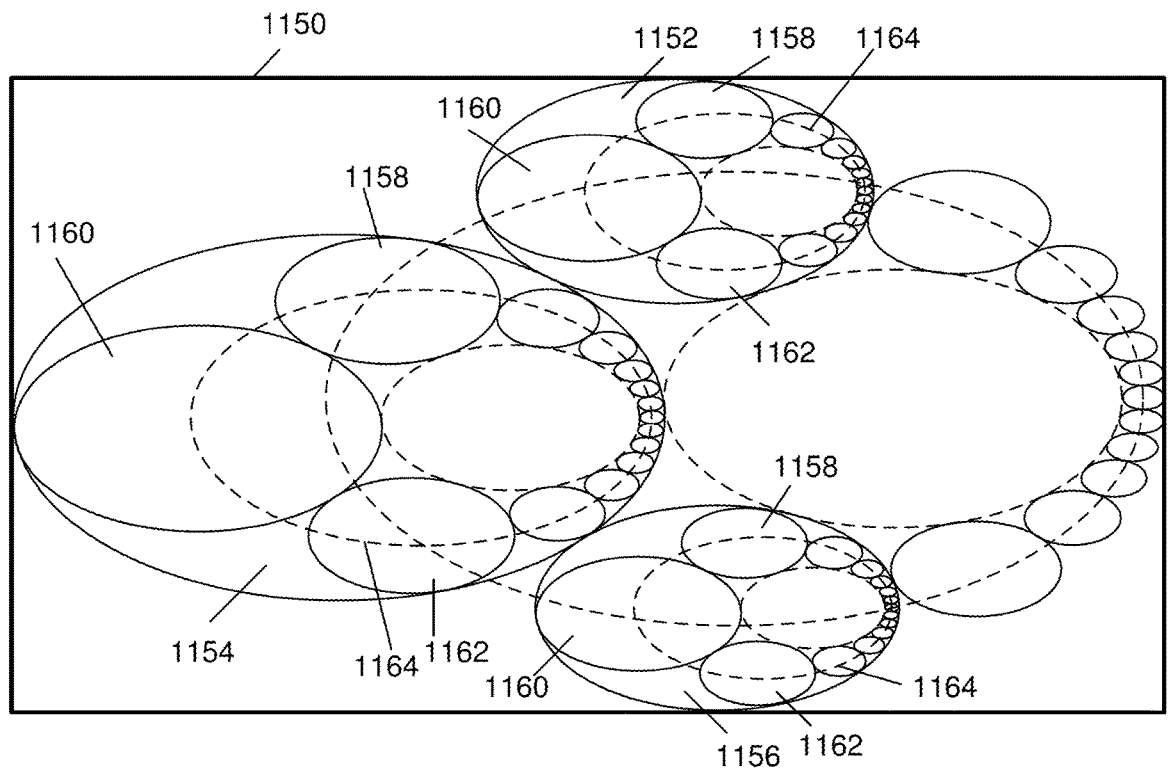
FIG. 13 illustrates a further implementation of a display and interaction method in a user interface according to the invention on a rectangular display.

Sub-heading hierarchies may alternatively already be displayed within an interactive item itself. FIG. 13 shows a display (1150) in accordance with the present invention wherein three interactive items (1152, 1154, 1156) are all lower order display regions. Each of these three interactive items (1152, 1154, 1156) are a smaller version of the main display, and each include a plurality of lower order interactive items (1158, 1160, 1162) on a lower order track (1164).

The lower order track extends along a lower order path (1164) created between an outer elliptical border and an inner elliptical border of the frame, with the inner border of the interactive items lying within the outer border of the interactive item and with a center of the inner border of the interactive item offset from a center of the outer border of the interactive item exactly as the main display of FIG. 10. A plurality of lower order elliptical frames are provided along the lower order track (1164), each lower order frame in contact with the outer border of the interactive item, the inner border of the interactive item, a first neighboring lower order frame adjacent it and in a first direction along the lower order track, and a second lower order neighboring frame adjacent it and in an opposite, second direction along the lower order track (1164).

When a selection action is performed on an interactive item including a lower order track, the lower order track with its interactive items expand to fill up the display (1150), and may be navigated exactly as explained above. The lower order items may be items in a hierarchy lower down, and may for example be a folder containing additional items. This may allow a user to navigate a folder structure.

It is envisaged that a selection input may need to be performed to enter a lower order hierarchy and display it on the display, while a return, back or undo input may return to a previous, higher hierarchy. Animation may be incorporated so that the lower order hierarchy shrinks back into an interactive item upon a return, back or undo input being received. A selection input may be tapping of a touch-sensitive display, a mouse click, or the like, while a return, back or undo input may be a different type of mouse click, a double tap, or the like.

It is envisaged that more than second lower order tracks and interactive items may be provided within lower order interactive items. This may provide an overview of a lower order hierarchy and may assist in navigating the structure. Lower order interactive items may also rotate on their respective interactive tracks with the main interactive items. It is envisaged that up to four levels of a hierarchy may be displayed at once. A size of a resolution and screen may determine the levels that may be adequately displayed at the same time. More than one input method may be employed to control the movement of different hierarchies of interactive items.

It will be apparent that some interactive items displayed on a track may be lower order hierarchies, while others may be interactive items that may be selected, such as an application or media file. This may be similar to navigating a file and folder structure typically found on a computer directory system.

Figure 14:
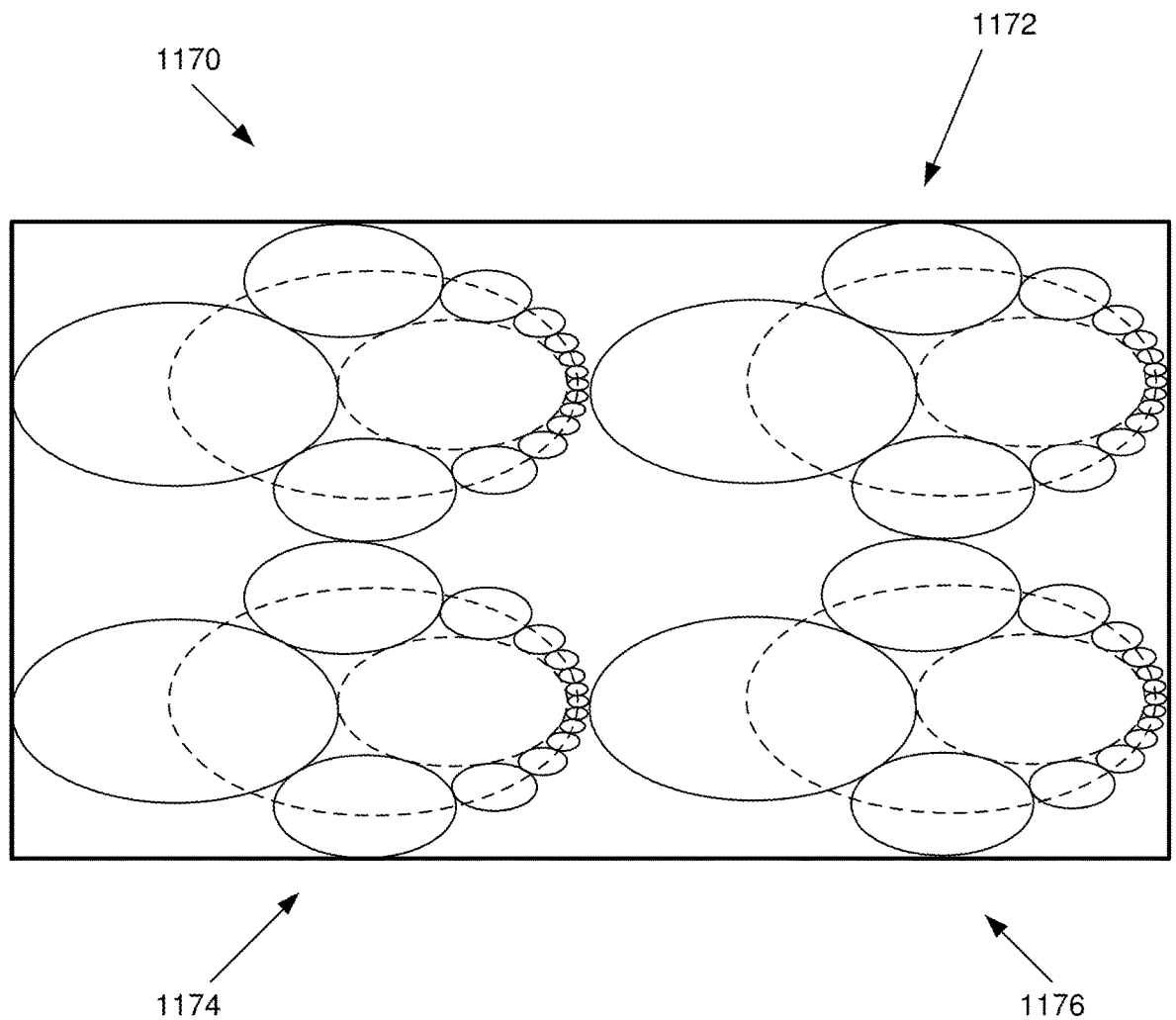
FIG. 14 illustrates a still further implementation of a display and interaction method in a user interface according to the invention on a rectangular display.

FIG. 14 shows an embodiment where multiple displays (1170, 1172, 1174, 1176) in accordance with the present invention are provided on a single rectangular display. Each of the displays may be individually controlled so that they rotate independently, and may also be individually selected to fill up the respective displays. This may allow a user oversight over several interactive items, for example where control of a machine is performed by a single person, or business intelligence information needs to be available to a user in a dashboard-like fashion. The displays may be controllable by appropriate input devices for each display, or with placement of a pointer over a specific one of the displays and interacting with the displays in any suitable manner, such as via a touch-sensitive display on which the displays may be provided, a mouse pointer, or the like.

It is further envisaged that the present method may be used to cycle through social media posts. A user may simply glance at the contents of the interactive item, presently then a social media post, and select the item to look at it in more detail. In the rectangular display shown in FIG. 14, where multiple displays (1170, 1172, 1174, 1176) are provided, a group of social media posts may be cycled within each display. This may allow a user to group social media posts by, for example, friends and family, influencers, celebrities, news sites, or the like. Each display may then display posts form an allocated group. This may provide a smoother browsing experience than scrolling through an extensive list. It will be apparent that social media posts may include videos, photos, text or the like, particularly a combination of such items.

The technique may be used with lean back interaction environments, for example when selecting videos on a large TV screen with a remote control. Advantages of such an embodiment may include continuous automatic introduction of new items via chain rotation and simplicity of control. The present invention may also be used to navigate television channels, where a user may wish to be provided with examples of what is currently played on a channel before selecting the channel itself.

It is envisaged that a unique remote control device may be provided to a user, with only a few buttons, with which the user may operate the display of the present invention. The remote may, for example, include a button to control a speed and/or direction of movement, a button to select an interactive item, or reverse a previously selected input. It will be apparent to a person skilled in the art that such a remote control device may allow full navigational control with minimal buttons provided. It is envisaged that a small narrow touch strip may suffice to control rotation rate, while selection may be implemented with a tap on the strip or with an additional button.

It is envisaged that a user may be able to adjust the appearance and/or operation of the display. The user may be allowed to change the number of frames on the display, the size of the outer boundary, the offset of the inner boundary, the difference in size between the largest and the smallest frame on the display, and the like. Furthermore, a user may be allowed to set a maximum movement speed for the frames, or may be allowed to choose a selection method that will select an interactive item in a frame.

It will be apparent that the present display method may be usable without the requirement for user interaction. In removing user interaction, the same display method may be employed simply to show content in various frames, which may provide a pleasant viewing and preview experience to a user.

Visibility of interactive items may be controlled in various ways. For example, items may be slightly out of focus in smaller frames, and may become more focused as their frames enlarge. Alternatively, the interactive items may be a fixed resolution, with more of the item becoming visible as the boundary of the frame enlarges, exposing more of the interactive item therein. As a further alternative, interactive items may be covered with disks of variable transparency.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A display and interaction method in a user interface of an electronic device including the steps of:
providing, at the electronic device, a display region of the user interface for displaying a plurality of interactive items on a track, the track extending along a path created between an elliptical outer border and an elliptical inner border, with the inner border lying within the outer border and with a center of the inner border offset from a center of the outer border;
displaying one or more interactive items along the track at the electronic device; and
in response to receiving a predetermined user input at the electronic device, moving the plurality of interactive items along the track, with the plurality of interactive items changing in size based on their position along the track whilst moving,
wherein a plurality of frames are provided along the track, wherein each of the one or more interactive items are based on one of the frames, a frame displaying only a part of an interactive item, the plurality of frames changing in size based on their position along the track, and wherein an interactive item changes in size corresponding to a change in size of its frame, and
wherein an increase in size of the frame allows for the interactive item to be more visible by displaying or revealing more parts or aspects of the interactive item.

2. The display and interaction method as claimed in claim 1 wherein each frame is in contact with the outer border and the inner border, with the plurality of frames changing in size to remain in contact with the inner border and with the outer border whilst moving.

3. The display and interaction method as claimed in claim 1 wherein each frame is in contact with a first neighboring frame adjacent it and in a first direction along the track, and a second neighboring frame adjacent it and in an opposite, second direction along the track.

4. The display and interaction method as claimed in claim 1 wherein the interactive items are larger than the frames resulting in an overlap of the interactive items.

5. The display and interaction method as claimed in claim 1, wherein the frames are hidden from view on the user interface with the interactive items being visible and displayed on the display.

6. The display and interaction method as claimed in claim 1 wherein the track is elliptical, the frames are elliptical, and centers of the elliptical frames move along the track.

7. The display and interaction method as claimed in claim 1 wherein a frame only displays a part of an interactive item, with an increase in size of the frame allowing for visibility of more of the interactive item.

8. The display and interaction method as claimed in claim 1, wherein the track, the outer border and the inner border are hidden from view on the user interface while the interactive items are displayed.

9. The display and interaction method as claimed in claim 1 further comprising the step of: via a configuration interface at the electronic device, adjusting one or more of: a size of the outer border, an offset of the center of the inner border from the center of the outer border, a size of the inner border, a number of interactive items, an orientation of the track with respect to the display region, and any combination thereof.

10. The display and interaction method as claimed in claim 1, wherein a central region within the inner border is used as an information display space.

11. The display and interaction method as claimed in claim 10, wherein the information display space includes information relating to one of: a largest displayed interactive item, all of the interactive items, or a subset of the interactive items.

12. The display and interaction method as claimed in claim 1 wherein the outer border is defined by or lies adjacent to a boundary of a circular display of the electronic device.

13. The display and interaction method as claimed in claim 1 further comprising the step of, in response to receiving a selection input at the electronic device, selecting an interactive item.

14. The display and interaction method as claimed in claim 1 wherein the predetermined user input includes a mode of touch interaction in which the interactive items are moved along the track in response to a rotating touch input on a touch-sensitive display of the user interface or in response to a rotation flicking gesture on the touch-sensitive display in a desired rotation direction.

15. A display and interaction method in a user interface of an electronic device including the steps of:
providing, at the electronic device, a display region of the user interface for displaying a plurality of interactive items on a track, the track extending along a path created between an elliptical outer border and an elliptical inner border, with the inner border lying within the outer border and with a center of the inner border offset from a center of the outer border;
displaying one or more interactive items along the track at the electronic device; and
in response to receiving a predetermined user input at the electronic device, moving the plurality of interactive items along the track, with the plurality of interactive items changing in size based on their position along the track whilst moving,
and wherein the non-linear speed control is a one dimensional control having a center point from which touch movement in a first direction away from the center point causes accelerated rotation of the interactive items in a first direction along the track and touch movement in a second direction away from the center point causes an accelerated rotation of the interactive items in a second direction along the track.

16. A display and interaction method in a user interface of an electronic device including the steps of:
   providing, at the electronic device, a display region of the user interface for displaying a plurality of interactive items on a track, the track extending along a path created between an elliptical outer border and an elliptical inner border, with the inner border lying within the outer border and with a center of the inner border offset from a center of the outer border;
   displaying one or more interactive items along the track at the electronic device; and
   in response to receiving a predetermined user input at the electronic device, moving the plurality of interactive items along the track, with the plurality of interactive items changing in size based on their position along the track whilst moving, wherein the interactive items define hierarchy headings, with selection of a main hierarchy heading interactive item causing replacement of the interactive items on the display with sub-heading interactive items associated with the selected hierarchy heading interactive item.

17. A display and interaction method in a user interface of an electronic device including the steps of:
   providing, at the electronic device, a display region of the user interface for displaying a plurality of interactive items on a track, the track extending along a path created between an elliptical outer border and an elliptical inner border, with the inner border lying within the outer border and with a center of the inner border offset from a center of the outer border;
   displaying one or more interactive items along the track at the electronic device; and in response to receiving a predetermined user input at the electronic device, moving the plurality of interactive items along the track, with the plurality of interactive items changing in size based on their position along the track whilst moving, wherein moving the plurality of interactive items along the track includes moving the interactive items at an initial speed by means of a flick touch gesture, the movement simulating inertia by the interactive items gradually slowing down and coming to a stop if no further user interaction is received.

18. The display and interaction method as claimed in claim 1 wherein the interactive items are selected from a list comprising: multimedia items, emoticons, menu headings, social media posts, video previews, application icons, contact list items, phone numbers, and any combination thereof.

19. An electronic device having a user interface and comprising:
   a processor;
   a non-transitory memory having instructions encoded thereon that, when executed by the processor, cause the processor to:
      display a plurality of interactive items on a track on the user interface, the track extending along a path created between an elliptical outer border and an elliptical inner border, with the inner border lying within the outer border and with a center of the inner border offset from a center of the outer border;
      display one or more interactive items along the track; and
   receive user input and in response to receiving a predetermined user input, move the plurality of interactive items along the track, with the plurality of interactive items changing in size based on their position along the track whilst moving,
   wherein a plurality of frames are provided along the track, wherein each of the one or more interactive items are based on one of the frames, a frame displaying only a part of an interactive item, the plurality of frames changing in size based on their position along the track, and wherein an interactive item changes in size corresponding to a change in size of its frame, and
   wherein an increase in size of the frame allows for the interactive item to be more visible by displaying or revealing more parts or aspects of the interactive item.

* * * * *